US008131068B2

(12) United States Patent
Abe et al.

(10) Patent No.: US 8,131,068 B2
(45) Date of Patent: Mar. 6, 2012

(54) IMAGE MATCHING DEVICE AND CAMERA

(75) Inventors: Hiroyuki Abe, Yokohama (JP); Kenichi Ohba, Tokyo (JP)

(73) Assignee: Nikon Corporation, Tokyo (JP)

( * ) Notice: Subject to any disclaimer, the term of this patent is extended or adjusted under 35 U.S.C. 154(b) by 373 days.

(21) Appl. No.: 12/457,091

(22) Filed: Jun. 1, 2009

(65) Prior Publication Data

US 2010/0007758 A1 Jan. 14, 2010

(30) Foreign Application Priority Data

| Jun. 6, 2008 | (JP) | 2008-149320 |
| Dec. 26, 2008 | (JP) | 2008-333460 |
| Apr. 17, 2009 | (JP) | 2009-100751 |
| May 19, 2009 | (JP) | 2009-120739 |

(51) Int. Cl.
*G06K 9/00* (2006.01)

(52) U.S. Cl. ........ 382/162; 382/164; 382/165; 382/167; 382/218; 382/275; 375/590; 375/591; 348/453

(58) Field of Classification Search .................. 382/103, 382/162, 164, 165, 167, 218, 275, 264, 199; 345/589, 590, 591, 592, 596, 602, 604; 348/453
See application file for complete search history.

(56) References Cited

U.S. PATENT DOCUMENTS

| 5,790,695 | A | 8/1998 | Suwa |
| 7,853,075 | B2* | 12/2010 | Mattausch et al. ............. 382/164 |
| 2001/0052928 | A1* | 12/2001 | Imagawa et al. ............ 348/14.12 |
| 2004/0066970 | A1* | 4/2004 | Matsugu ........................ 382/217 |
| 2005/0237544 | A1* | 10/2005 | Suzuki et al. ................... 358/1.2 |
| 2007/0014433 | A1* | 1/2007 | Yano ............................. 382/103 |
| 2007/0223819 | A1 | 9/2007 | Yamamoto |
| 2008/0075385 | A1* | 3/2008 | David et al. ................... 382/275 |
| 2008/0181494 | A1* | 7/2008 | Watanabe et al. ............. 382/167 |
| 2010/0260381 | A1 | 10/2010 | Ito |

FOREIGN PATENT DOCUMENTS

JP A-5-81433 4/1993

(Continued)

OTHER PUBLICATIONS

Japanese Office Action issued in Japanese Patent Application No. 2009-100751 dated Feb. 8, 2011 (with translation).

(Continued)

*Primary Examiner* — Samir Ahmed
*Assistant Examiner* — Ali Bayat
(74) *Attorney, Agent, or Firm* — Oliff & Berridge, PLC

(57) ABSTRACT

An image matching device includes: a dividing unit that divides a target image, contained in a search window set within an input image constituted with pixels each having a luminance component and a chrominance component, and a template image constituted with pixels each having the luminance component and the chrominance component, each into a plurality of divided areas; a representative value calculation unit that calculates a luminance component representative value and a chrominance component representative value in correspondence to each of the divided areas; a normalizing unit that normalizes the luminance component representative value having been calculated in correspondence to each divided area; and a template matching processing unit that executes template matching processing based upon the normalized luminance component representative value and the chrominance component representative value corresponding to each of the divided areas in the template image, and upon the normalized luminance component representative value and the chrominance component representative value corresponding to each of the divided areas in the target image.

19 Claims, 25 Drawing Sheets

FOREIGN PATENT DOCUMENTS

| | | |
|---|---|---|
| JP | A-5-292489 | 11/1993 |
| JP | A-6-133300 | 5/1994 |
| JP | A-6-231254 | 8/1994 |
| JP | A-07-057090 | 3/1995 |
| JP | A-07-336726 | 12/1995 |
| JP | A-11-096364 | 4/1999 |
| JP | A-2001-330882 | 11/2001 |
| JP | A-2002-185808 | 6/2002 |
| JP | A-2003-070742 | 3/2003 |
| JP | A-2006-345388 | 12/2006 |
| JP | A-2007-259107 | 10/2007 |
| JP | A-2010-020602 | 1/2010 |
| JP | A-2010-245923 | 10/2010 |

OTHER PUBLICATIONS

Office Action issued Apr. 20, 2010 in Japanese Patent Application No. 2009-120739 (with translation).

\* cited by examiner

FIG.3A

|   |   |   |
|---|---|---|
| ① | ② | ③ |
| ④ | ⑤ | ⑥ |
| ⑦ | ⑧ | ⑨ |

FIG.3B

|   | Y | Cb | Cr |
|---|-----|-----|-----|
| ① | 76  | 113 | 143 |
| ② | 127 | 107 | 151 |
| ③ | 96  | 113 | 145 |
| ④ | 89  | 109 | 148 |
| ⑤ | 106 | 105 | 154 |
| ⑥ | 102 | 107 | 151 |
| ⑦ | 96  | 109 | 146 |
| ⑧ | 97  | 107 | 154 |
| ⑨ | 107 | 105 | 150 |

FIG.4A
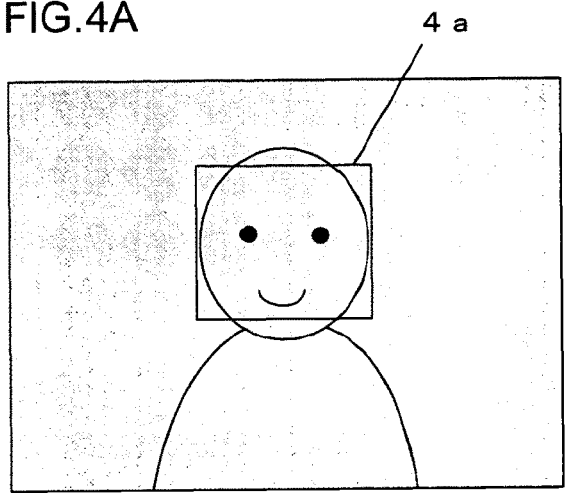
FIG.4C
|   | Y | Cb | Cr |
|---|---|----|----|
| ① | 76 | 113 | 143 |
| ② | 127 | 107 | 151 |
| ③ | 96 | 113 | 145 |
| ④ | 89 | 109 | 148 |
| ⑤ | 106 | 105 | 154 |
| ⑥ | 102 | 107 | 151 |
| ⑦ | 96 | 109 | 146 |
| ⑧ | 97 | 107 | 154 |
| ⑨ | 107 | 105 | 150 |
FIG.4B
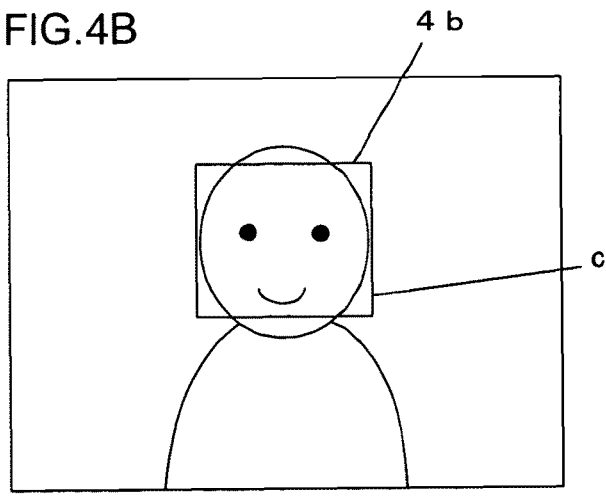
FIG.4D
|   | Y | Cb | Cr |
|---|---|----|----|
| ① | 121 | 102 | 156 |
| ② | 170 | 98 | 159 |
| ③ | 131 | 106 | 153 |
| ④ | 119 | 99 | 160 |
| ⑤ | 148 | 95 | 164 |
| ⑥ | 121 | 102 | 157 |
| ⑦ | 152 | 97 | 160 |
| ⑧ | 145 | 99 | 162 |
| ⑨ | 159 | 97 | 159 |

FIG.5A

| | Y | Cb | Cr |
|---|---|---|---|
| ① | -30 | 113 | 143 |
| ② | 21 | 107 | 151 |
| ③ | -10 | 113 | 145 |
| ④ | -17 | 109 | 148 |
| ⑤ | 0 | 105 | 154 |
| ⑥ | -4 | 107 | 151 |
| ⑦ | -10 | 109 | 146 |
| ⑧ | -9 | 107 | 154 |
| ⑨ | 1 | 105 | 150 |

FIG.5B

| | Y | Cb | Cr |
|---|---|---|---|
| ① | -27 | 102 | 156 |
| ② | 22 | 98 | 159 |
| ③ | -17 | 106 | 153 |
| ④ | -29 | 99 | 160 |
| ⑤ | 0 | 95 | 164 |
| ⑥ | -27 | 102 | 157 |
| ⑦ | 4 | 97 | 160 |
| ⑧ | -3 | 99 | 162 |
| ⑨ | 11 | 97 | 159 |

```
     Y    Cb   Cr
① 43   123  128
② 61   118  147
③ 25    97  160
④ 56   118  127
⑤ 54   119  139
⑥ 13   104  150
⑦ 50   121  128
⑧ 78   106  128
⑨ 37   112  141
```

```
     Y    Cb   Cr
① -11  123  128
②  7   118  147
③ 71    97  160
④  2   118  127
⑤  0   119  139
⑥ 59   104  150
⑦ -4   121  128
⑧ 24   106  128
⑨ 83   112  141
```

| Y | Cb | Cr |
|---|----|----|
| 54 | 126 | 129 |
| 53 | 126 | 129 |
| 54 | 126 | 129 |
| 55 | 126 | 129 |
| 55 | 126 | 129 |
| 55 | 126 | 129 |
| 55 | 126 | 129 |
| 55 | 126 | 129 |
| 55 | 126 | 129 |

| Y | Cb | Cr |
|---|----|----|
| 210 | 129 | 129 |
| 212 | 128 | 129 |
| 214 | 128 | 129 |
| 211 | 128 | 129 |
| 213 | 128 | 129 |
| 215 | 128 | 128 |
| 211 | 128 | 129 |
| 214 | 128 | 129 |
| 216 | 128 | 129 |

| Y-DIFFERENCE | Cb | Cr |
|---|----|----|
| -1 | 126 | 129 |
| -2 | 126 | 129 |
| -1 | 126 | 129 |
| 0 | 126 | 129 |
| 0 | 126 | 129 |
| 0 | 126 | 129 |
| 0 | 126 | 129 |
| 0 | 126 | 129 |
| 0 | 126 | 129 |

| Y-DIFFERENCE | Cb | Cr |
|---|----|----|
| -3 | 129 | 129 |
| -1 | 128 | 129 |
| 1 | 128 | 129 |
| -2 | 128 | 129 |
| 0 | 128 | 129 |
| 2 | 128 | 128 |
| -2 | 128 | 129 |
| 1 | 128 | 129 |
| 3 | 128 | 129 |

FIG.8A

| Y-DIFFERENCE | Cb | Cr | Y |
|---|---|---|---|
| −1 | 126 | 129 | 54 |
| −2 | 126 | 129 | 53 |
| −1 | 126 | 129 | 54 |
| 0 | 126 | 129 | 55 |
| 0 | 126 | 129 | 55 |
| 0 | 126 | 129 | 55 |
| 0 | 126 | 129 | 55 |
| 0 | 126 | 129 | 55 |
| 0 | 126 | 129 | 55 |

FIG.8B

| Y-DIFFERENCE | Cb | Cr | Y |
|---|---|---|---|
| −3 | 129 | 129 | 210 |
| −1 | 128 | 129 | 212 |
| 1 | 128 | 129 | 214 |
| −2 | 128 | 129 | 211 |
| 0 | 128 | 129 | 213 |
| 2 | 128 | 128 | 215 |
| −2 | 128 | 129 | 211 |
| 1 | 128 | 129 | 214 |
| 3 | 128 | 129 | 216 |

| 146 | 149 | 152 | 143 | 150 | 128 | 140 | 139 | 136 |
|-----|-----|-----|-----|-----|-----|-----|-----|-----|
| 154 | 153 | 150 | 149 | 146 | 107 | 140 | 135 | 131 |
| 157 | 150 | 147 | 145 | 142 | 98  | 129 | 134 | 130 |
| 161 | 150 | 147 | 146 | 143 | 98  | 123 | 133 | 132 |
| 150 | 146 | 143 | 142 | 139 | 114 | 112 | 132 | 123 |
| 148 | 142 | 139 | 136 | 133 | 130 | 114 | 123 | 117 |
| 147 | 139 | 136 | 133 | 130 | 126 | 109 | 117 | 118 |
| 150 | 135 | 132 | 129 | 125 | 119 | 114 | 119 | 119 |
| 156 | 131 | 128 | 123 | 119 | 114 | 118 | 119 | 119 |

| 117 | 90 | 35 | 17 | 17 | 17 | 17 | 18 | 20 |
|-----|----|----|----|----|----|----|----|----|
| 84  | 37 | 23 | 17 | 17 | 17 | 17 | 18 | 19 |
| 53  | 17 | 19 | 17 | 17 | 17 | 17 | 17 | 17 |
| 38  | 18 | 17 | 17 | 17 | 17 | 17 | 17 | 17 |
| 24  | 18 | 17 | 17 | 17 | 17 | 17 | 16 | 17 |
| 32  | 18 | 17 | 17 | 17 | 17 | 17 | 16 | 17 |
| 45  | 17 | 17 | 17 | 17 | 17 | 17 | 17 | 17 |
| 72  | 17 | 17 | 17 | 17 | 16 | 17 | 17 | 17 |
| 59  | 18 | 17 | 17 | 17 | 16 | 17 | 18 | 18 |

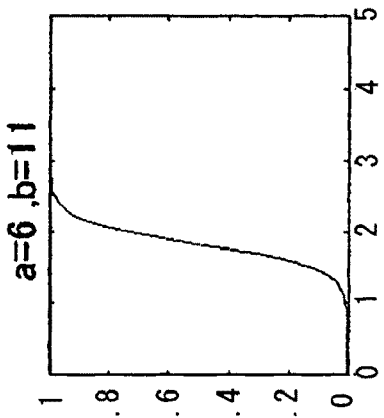
FIG.13D
FIG.13E
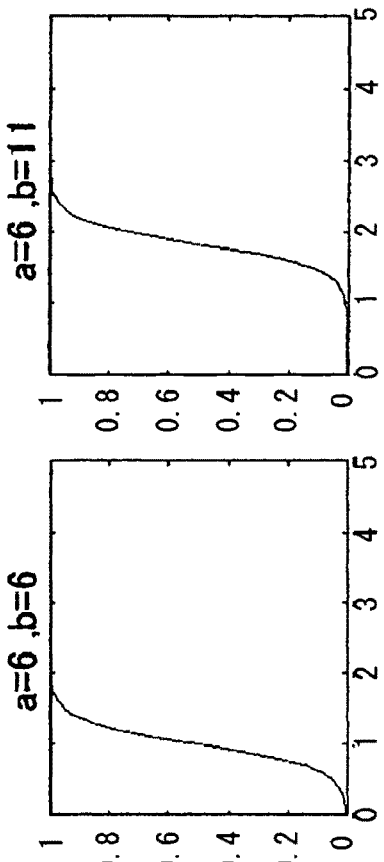
FIG.13C
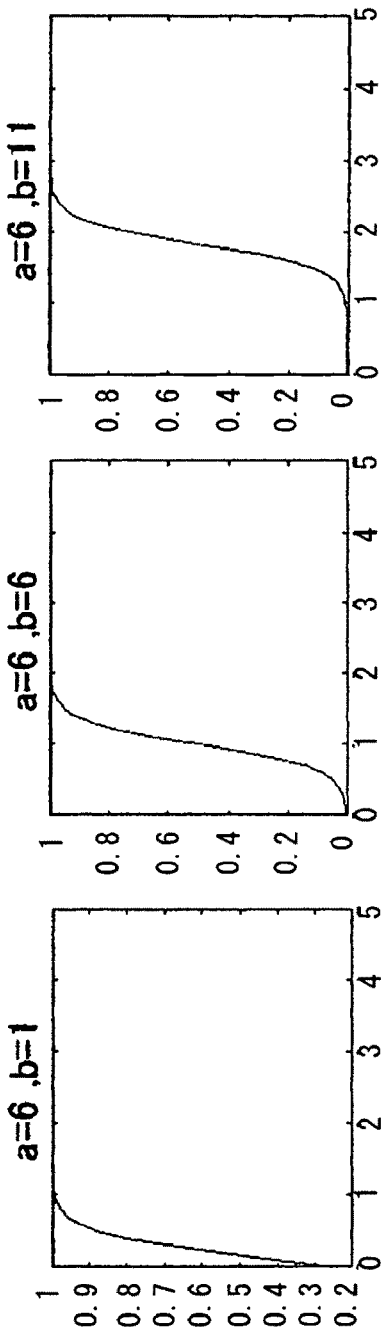
FIG.13A
FIG.13B

FIG.17A
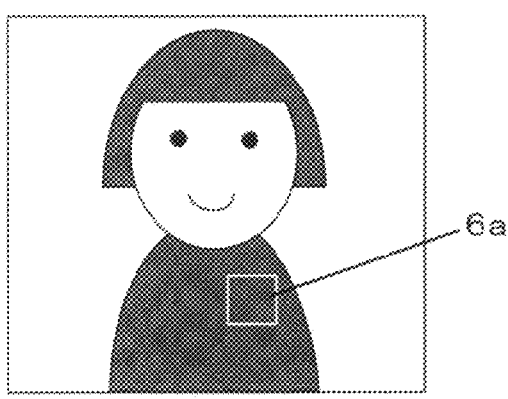
FIG.17B
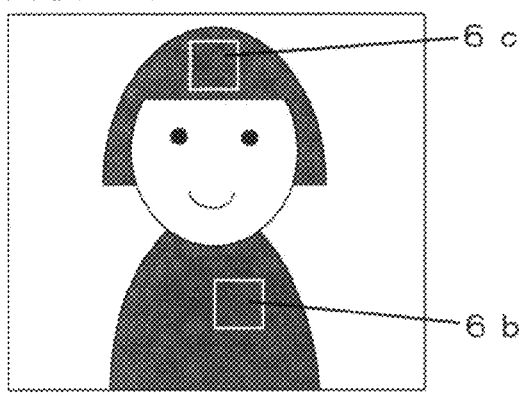
FIG.17C
AREA 6a
| Y | Cb | Cr |
|---|----|----|
| 35 | 127 | 128 |
| 40 | 126 | 127 |
| 58 | 125 | 129 |
| 35 | 127 | 127 |
| 41 | 126 | 128 |
| 62 | 123 | 131 |
| 34 | 126 | 128 |
| 41 | 126 | 128 |
| 68 | 124 | 130 |
$\beta = 0.01$
FIG.17D
AREA 6b
| Y | Cb | Cr |
|---|----|----|
| 32 | 127 | 127 |
| 34 | 126 | 127 |
| 44 | 126 | 128 |
| 31 | 126 | 127 |
| 32 | 126 | 127 |
| 38 | 126 | 128 |
| 33 | 127 | 127 |
| 34 | 127 | 127 |
| 48 | 125 | 129 |
$\beta = 0.006$
FIG.17E
AREA 6c
| Y | Cb | Cr |
|---|----|----|
| 69 | 127 | 125 |
| 66 | 127 | 126 |
| 63 | 126 | 127 |
| 51 | 125 | 127 |
| 52 | 125 | 127 |
| 59 | 125 | 127 |
| 58 | 125 | 128 |
| 52 | 125 | 128 |
| 50 | 125 | 129 |
$\beta = 0.009$

FIG.18A

| 1-2 Y | Cb | Cr |
|---|---|---|
| 3 | 0 | 1 |
| 6 | 0 | 0 |
| 14 | 1 | 1 |
| 4 | 1 | 0 |
| 9 | 0 | 1 |
| 24 | 3 | 3 |
| 1 | 1 | 1 |
| 7 | 1 | 1 |
| 20 | 1 | 1 |
| TOTAL =88 | 8 | 9 |

FIG.18B

| 1-3 Y | Cb | Cr |
|---|---|---|
| 34 | 0 | 3 |
| 26 | 1 | 1 |
| 5 | 1 | 2 |
| 16 | 2 | 0 |
| 11 | 1 | 1 |
| 3 | 2 | 4 |
| 24 | 1 | 0 |
| 11 | 1 | 0 |
| 18 | 1 | 1 |
| TOTAL =148 | 10 | 12 |

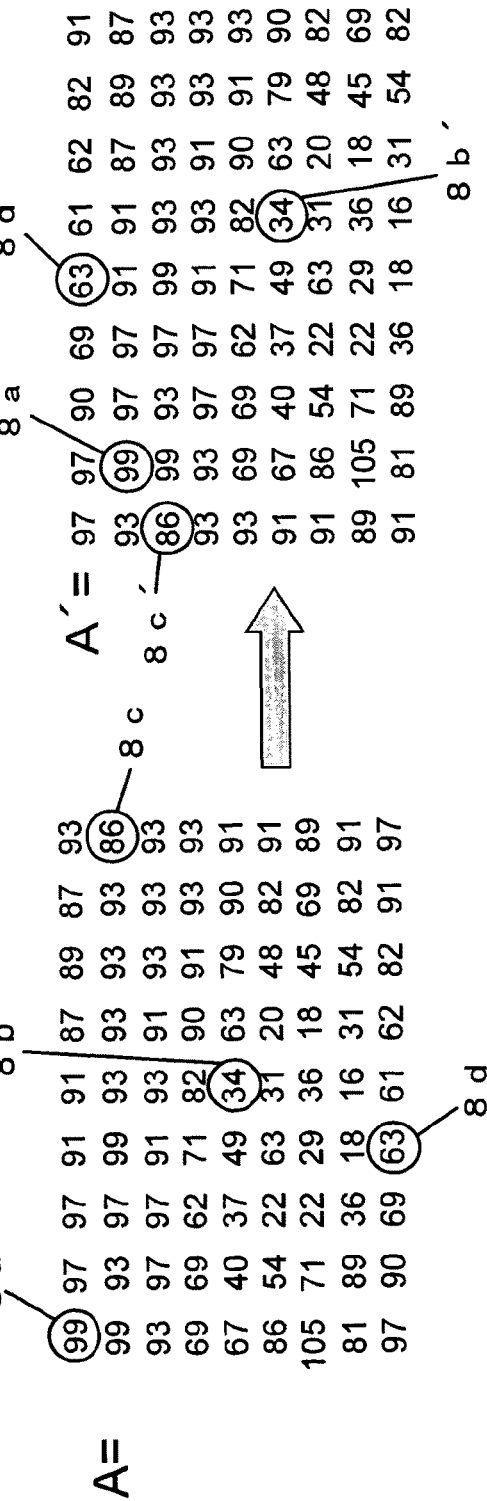

Y EDGE IMAGE

Y IMAGE

| Y | Cb | Cr |
|---|----|----|
| 230 | 128 | 128 |
| 171 | 128 | 130 |
| 65 | 127 | 130 |
| 214 | 129 | 130 |
| 142 | 129 | 132 |
| 111 | 128 | 130 |
| 221 | 128 | 129 |
| 156 | 128 | 131 |
| 93 | 127 | 130 |

| Y | Cb | Cr |
|---|----|----|
| 223 | 128 | 129 |
| 52 | 127 | 131 |
| 50 | 127 | 130 |
| 188 | 128 | 130 |
| 92 | 127 | 130 |
| 51 | 127 | 130 |
| 149 | 129 | 132 |
| 135 | 128 | 131 |
| 50 | 127 | 129 |

| Y | Cb | Cr |
|---|----|----|
| 234 | 128 | 128 |
| 209 | 128 | 129 |
| 135 | 128 | 131 |
| 234 | 128 | 129 |
| 234 | 128 | 129 |
| 193 | 128 | 130 |
| 234 | 128 | 128 |
| 227 | 128 | 129 |
| 177 | 128 | 130 |

| Y | Cb | Cr |
|---|----|----|
| 230 | 128 | 128 |
| 124 | 128 | 131 |
| 123 | 129 | 131 |
| 232 | 128 | 129 |
| 167 | 128 | 130 |
| 123 | 128 | 131 |
| 234 | 128 | 129 |
| 223 | 128 | 129 |
| 123 | 128 | 131 |

FIG.22

| A-B1 | Y | Cb | Cr |     | A-B2 | Y | Cb | Cr |     | A-B3 | Y | Cb | Cr |
|------|---|----|----|-----|------|---|----|----|-----|------|---|----|----|
|      | 7 | 0  | 1  |     |      | 4 | 0  | 0  |     |      | 0 | 0  | 0  |
|      | 119 | 1 | 1 |     |      | 38 | 0 | 1 |     |      | 47 | 0 | 1 |
|      | 15 | 0  | 0  |     |      | 70 | 1 | 1 |     |      | 58 | 2 | 1 |
|      | 26 | 1  | 0  |     |      | 20 | 1 | 1 |     |      | 18 | 1 | 1 |
|      | 50 | 2  | 2  |     |      | 92 | 1 | 1 |     |      | 25 | 1 | 2 |
|      | 60 | 1  | 0  |     |      | 82 | 0 | 3 |     |      | 12 | 0 | 1 |
|      | 72 | 1  | 3  |     |      | 13 | 0 | 0 |     |      | 13 | 0 | 0 |
|      | 21 | 0  | 0  |     |      | 71 | 0 | 1 |     |      | 67 | 0 | 2 |
|      | 43 | 0  | 1  |     |      | 84 | 1 | 0 |     |      | 30 | 1 | 1 |

TOTAL =413  6  8              TOTAL =474  4  9              TOTAL =(270)  5  9

GRAND TOTAL =427              GRAND TOTAL =487              GRAND TOTAL =284

FIG.23

| A | | | | B1 | | | | B2 | | | | B3 | | |
|---|---|---|---|---|---|---|---|---|---|---|---|---|---|---|
| Y | EDGE | Cb | Cr | Y | EDGE | Cb | Cr | Y | EDGE | Cb | Cr | Y | EDGE | Cb | Cr |
| 0 | 128 | 128 | | 1 | 128 | 129 | | 0 | 128 | 128 | | 1 | 128 | 128 |
| 1 | 128 | 130 | | 0 | 127 | 131 | | 0 | 128 | 129 | | 1 | 128 | 131 |
| 13 | 127 | 130 | | 1 | 127 | 130 | | 13 | 128 | 131 | | 1 | 129 | 131 |
| 0 | 129 | 130 | | 1 | 128 | 130 | | 0 | 128 | 129 | | 0 | 128 | 129 |
| 1 | 129 | 132 | | 15 | 127 | 130 | | 1 | 128 | 129 | | 18 | 128 | 130 |
| 3 | 128 | 130 | | 1 | 127 | 130 | | 6 | 128 | 130 | | 1 | 128 | 131 |
| 1 | 128 | 129 | | 1 | 129 | 132 | | 0 | 128 | 128 | | 0 | 128 | 129 |
| 12 | 128 | 131 | | 1 | 128 | 131 | | 0 | 128 | 129 | | 1 | 128 | 129 |
| 1 | 127 | 130 | | 3 | 127 | 129 | | 1 | 128 | 130 | | 4 | 128 | 131 |

FIG.24

| A-B1 (Y EDGE Cb Cr) | A-B2 (Y EDGE Cb Cr) | A-B3 (Y EDGE Cb Cr) |
|---|---|---|
| 1 1 0 1 | 0 0 0 | 1 0 0 |
| 1 1 1 | 1 1 1 1 | 0 0 1 |
| 12 0 0 | 0 1 1 | 12 2 1 |
| 1 2 0 | 0 1 1 | 0 1 1 |
| 14 1 2 | 3 0 3 | 17 1 2 |
| 2 2 0 | 1 0 0 | 2 0 1 |
| 0 1 3 | 12 0 1 | 1 0 0 |
| 11 0 0 | 0 1 2 | 11 1 0 |
| 2 0 1 | 0 1 0 | 3 1 2 |
| TOTAL 44 6 8 | TOTAL (17) 4 9 | TOTAL 47 5 9 |
| GRAND TOTAL =58 | GRAND TOTAL =30 | GRAND TOTAL =61 |

IMAGE MATCHING DEVICE AND CAMERA

INCORPORATION BY REFERENCE

The disclosures of the following priority applications are herein incorporated by reference:
Japanese Patent Application No. 2008-149320 filed Jun. 6, 2008;
Japanese Patent Application No. 2008-333460 filed Dec. 26, 2008;
Japanese Patent Application No. 2009-100751 filed Apr. 17, 2009; and
Japanese Patent Application No. 2009-120739 filed May 19, 2009.

BACKGROUND OF THE INVENTION

1. Field of the Invention

The present invention relates to a subject tracking device engaged in frame-to-frame tracking of a photographic subject through a plurality of images and a camera equipped with a subject tracking function.

2. Description of Related Art

The pattern matching methods known in the related art include that disclosed in Japanese Laid Open Patent Publication No. H5-81433. In this pattern matching method, an image is divided into a plurality of areas, each area undergoes template matching processing and the area with the highest level of similarity is extracted as a matching area.

SUMMARY OF THE INVENTION

However, if the brightness of the target image relatively changes to the template image as the subject position within the image is identified through template matching and the subject position is tracked from frame to frame through the method in the related art, the change in the brightness of the image affects the similarity calculation results, which may lead to lowered template matching accuracy.

According to the 1st aspect of the present invention, an image matching device comprises: a dividing unit that divides a target image, contained in a search window set within an input image constituted with pixels each having a luminance component and a chrominance component, and a template image constituted with pixels each having the luminance component and the chrominance component, each into a plurality of divided areas; a representative value calculation unit that calculates a luminance component representative value and a chrominance component representative value in correspondence to each of the divided areas; a normalizing unit that normalizes the luminance component representative value having been calculated in correspondence to each divided area; and a template matching processing unit that executes template matching processing based upon the normalized luminance component representative value and the chrominance component representative value corresponding to each of the divided areas in the template image, and upon the normalized luminance component representative value and the chrominance component representative value corresponding to each of the divided areas in the target image.

According to the 2nd aspect of the present invention, in the image matching device according to the 1st aspect, it is preferred that the luminance component representative value calculated in correspondence to each divided area is a luminance component average value, a luminance component sum or a luminance component median corresponding to the divided area, and the chrominance component representative value calculated in correspondence to each divided area is a chrominance component average value, a chrominance component sum or a chrominance component median corresponding to the divided area.

According to the 3rd aspect of the present invention, in the image matching device according to the 1st aspect, the image matching device further comprises a subject tracking unit that tracks a subject from one input image to a next input image among a plurality of input images based upon matching results provided by the template matching processing unit.

According to the 4th aspect of the present invention, in the image matching device according to the 1st aspect, it is preferred that the normalizing unit normalizes the luminance component representative value corresponding to each divided area by designating one divided area among the plurality of divided areas as a reference area and subtracting the luminance component representative value corresponding to the reference area from the luminance component representative value corresponding to each of the plurality of divided areas.

According to the 5th aspect of the present invention, in the image matching device according to the 1st aspect, it is preferred that: the input image is an image expressed in a YCbCr color space, the luminance component corresponds to a Y component in the YCbCr color space and the chrominance component corresponds to a Cb component and a Cr component in the YCbCr color space; and the template matching processing unit executes the template matching processing based upon Cb component values each corresponding to one of the divided areas, Cr component values each corresponding to one of the divided areas and normalized Y component values each normalized by the normalizing unit in correspondence to one of the divided areas in both the template image and the target image.

According to the 6th aspect of the present invention, in the image matching device according to the 1st aspect, it is preferred that: the input image is an image expressed in a YCbCr color space, the luminance component corresponds to a Y component in the YCbCr color space and the chrominance component corresponds to a Cb component and a Cr component in the YCbCr color space; and the template matching processing unit executes the template matching processing based upon Y component values each corresponding to one of the divided areas, Cb component values each corresponding to one of the divided areas, Cr component values each corresponding to one of the divided areas and normalized Y component values each normalized by the normalizing unit in correspondence to one of the divided areas in both the template image and the target image.

According to the 7th aspect of the present invention, in the image matching device according to the 5th aspect, it is preferred that the normalizing unit normalizes the Y component value corresponding to each divided area by designating one divided area among the plurality of divided areas as a reference area and subtracting the Y component value corresponding to the reference area from the Y component value corresponding to each of the plurality of divided areas.

According to the 8th aspect of the present invention, a camera comprises: an imaging unit that obtains an image by capturing a subject image; and an image matching device according to the 3rd aspect, and the image matching device executes the template matching processing by designating each of images captured in time series at the imaging unit as the target image to track a photographic subject from one image to a next among a plurality of images.

According to the 9th aspect of the present invention, in the image matching device according to the 1st aspect, it is preferred that: the image matching device further comprises a coefficient calculation unit that calculates a coefficient based upon chrominance component values indicated at individual pixels in correspondence to each of the template image and the target image; the normalizing unit normalizes the luminance component representative value corresponding to the divided area by designating the luminance component representative value in one of the divided areas as a reference value and subtracting the reference value multiplied by the coefficient from a luminance component average value corresponding to the divided area; and the template matching processing unit calculates a similarity factor indicating a level of similarity between the template image and the target image based upon the normalized luminance component representative value and the chrominance component representative value corresponding to each of the divided areas in the template image, and upon the normalized luminance component representative value and the chrominance component representative value corresponding to each of the divided areas in the target image, and executes template matching processing by identifying a position taken up within the input image by the target image achieving a highest level of similarity to the template image based upon similarity factor calculation results.

According to the 10th aspect of the present invention, in the image matching device according to the 9th aspect, it is preferred that the luminance component representative value calculated in correspondence to each divided area is a luminance component average value, a luminance component sum or a luminance component median corresponding to the divided area, and the chrominance component representative value calculated in correspondence to each divided area is a chrominance component average value, a chrominance component sum or a chrominance component median corresponding to the divided area.

According to the 11th aspect of the present invention, in the image matching device according to the 9th aspect, it is preferred that the coefficient assumes a value within a range of 0 to 1.

According to the 12th aspect of the present invention, in the image matching device according to the 11th aspect, it is preferred that the coefficient is a value output through a differentiable function, an output value of which takes on continuous values within the range of 0 to 1 and is determined univocally relative to an input value.

According to the 13th aspect of the present invention, in the image matching device according to the 12th aspect, it is preferred that the function is a sigmoid function.

According to the 14th aspect of the present invention, in the image matching device according to the 1st aspect, it is preferred that: the image matching device further comprises a coefficient calculation unit that calculates a coefficient based upon chrominance component values indicated at individual pixels in correspondence to each of the template image and the target image; the normalizing unit normalizes the luminance component representative value corresponding to each divided area by designating the luminance component representative value in one of the divided areas as a reference value and subtracting the reference value multiplied by the coefficient from a luminance component average value corresponding to the divided area; and the coefficient takes on a value within a range of 0 to 1 to indicate a level of achromaticity of an image, with the coefficient assuming a value closer to 0 indicating that the image is more achromatic and the coefficient assuming a value closer to 1 indicating that the image is more chromatic.

According to the 15th aspect of the present invention, a camera comprises: an imaging unit that obtains an image by capturing a subject image; and an image matching device according to the 9th aspect.

According to the 16th aspect of the present invention, an image matching device comprises: a component similarity value calculation unit that calculates a luminance similarity value and a chrominance similarity value by using a template image constituted with pixels each having a luminance component and a chrominance component and a target image contained within a search window set within an input image constituted with pixels each having the luminance component and the chrominance component, respectively based upon the luminance component in the template image and the target image and based upon the chrominance component in the template image and the target image; an achromaticity factor calculation unit that calculates a value indicating a level of achromaticity of the template image or the target image based upon values indicating the chrominance component in the template image or the target image; a similarity value calculation unit that calculates a similarity value indicating a level of similarity between the template image and the target image by weighting the luminance similarity value and the chrominance similarity value based upon the value indicating the level of achromaticity having been calculated by the achromaticity factor calculation unit; and a matching unit that executes template matching processing by identifying a position taken up within the input image by the target image achieving a highest level of similarity to the template image based upon similarity value calculation results provided by the similarity value calculation unit.

According to the 17th aspect of the present invention, an image matching device comprises: a component similarity value calculation unit that calculates a luminance similarity value and a chrominance similarity value by using a template image constituted with pixels each having a luminance component and a chrominance component and a target image contained within a search window set within an input image constituted with pixels each having the luminance component and the chrominance component, and generating luminance edge images expressed with edges of the luminance component, extracted from the template image and the target image, respectively based upon the luminance edge images corresponding to the template image and the target image and based upon the chrominance component in the template image and the target image; an chromaticity factor calculation unit that calculates a value indicating a level of achromaticity of the template image or the target image based upon values indicating the chrominance component in the template image or the target image; a similarity value calculation unit that calculates a similarity value indicating a level of similarity between the template image and the target image by weighting the luminance similarity value and the chrominance similarity value based upon the value indicating the level of achromaticity having been calculated by the achromaticity factor calculation unit; and a matching unit that executes template matching processing by identifying a position taken up within the input image by the target image achieving a highest level of similarity to the template image based upon similarity value calculation results provided by the similarity value calculation unit.

According to the 18th aspect of the present invention, an image matching device comprises: an edge image generation unit that generates luminance edge images, one based upon a template image constituted with pixels each having a luminance component and a chrominance component and another based upon a target image contained within a search window set within an input image constituted with pixels each having a luminance component and the chrominance component, by extracting edges of the luminance component from the template image and the target image; a component similarity value calculation unit that calculates a luminance similarity value based upon the luminance edge image generated based upon the template image and the luminance edge image generated based upon the target image and a chrominance similarity value based upon the chrominance component in the template image and the target image; a similarity value calculation unit that calculates a similarity value indicating a level of similarity between the template image and the target image based upon the luminance similarity value and the chrominance similarity value calculated by the component similarity value calculation unit; and a matching unit that executes template matching processing by identifying a position taken up within the input image by the target image achieving a highest level of similarity to the template image based upon similarity value calculation results provided by the similarity value calculation unit.

According to the 19th aspect of the present invention, in the image matching device according to the 16th aspect, it is preferred that the value indicating the level of achromaticity falls within a range of 0 to 1.

According to the 20th aspect of the present invention, in the image matching device according to the 19th aspect, it is preferred that the value indicating the level of achromaticity is output through a differentiable function, an output value of which takes on continuous values within the range of 0 to 1 and is determined univocally relative to an input value.

According to the 21st aspect of the present invention, in the image matching device according to the 20th aspect, it is preferred that the function is a sigmoid function.

According to the 22nd aspect of the present invention, a camera comprises: an imaging unit that obtains an image by capturing a subject image; and an image matching device according to the 16th aspect.

BRIEF DESCRIPTION OF THE DRAWINGS

FIG. 3A illustrates an example in the first embodiment, of the template image A and the target image B divided into 9 blocks. FIG. 3B presents an example of calculation results in the individual blocks for luminance component average value and chrominance component average values;

FIGS. 4A through 4D present an example in the first embodiment, where the image brightness is changed;

FIGS. 5A and 5B presents an example in the first embodiment, where the Y component average values in FIGS. 4C and 4D are normalized;

FIGS. 8A and 8B present a second specific example in the first embodiment for a whitish area and a blackish area, showing their Y component average values, the Cb component average values, the Cr component average values and the normalized Y component average values;

FIGS. 10A through 10G are of a second embodiment, presenting an example of chrominance component values obtained for individual pixels in each of the areas set in the image;

FIGS. 11A and 11B are of a second embodiment, presenting an example of luminance component values obtained for individual pixels in each of the areas set in the image;

FIGS. 13A through 13E each present, in the second embodiment, a second specific example of a sigmoid function FIGS. 14A through 14C present, in the second embodiment, an example of chrominance component values obtained for individual pixels in each of the areas set in the image;

FIGS. 17A through 17E present, in the third embodiment, a specific example of the template image of achromatic colors;

FIGS. 18A and 18B each present, in the third embodiment, an example of calculation results that are obtained by calculating average values for the various components in each block;

FIGS. 19A through 19C illustrate, in the third embodiment, how a Y edge image is generated;

FIGS. 21A through 21D present, in the third embodiment, an example of calculation results of the average values for each component, which are calculated for individual blocks of the template image and the target images, respectively;

FIG. 22 demonstrates, in the third embodiment, an example of calculation results on a value of similarity between the template image and the target image;

FIG. 23 presents, in the third embodiment, an example of calculation results of average values for each component, which are calculated in individual blocks of the template image and the target images, respectively, wherein the Y edge images are generated;

FIG. 24 demonstrates, in the third embodiment, an example of calculation results of similarity between the template image and the target images, respectively, wherein the with Y edge images are generated; and FIG. 25 illustrates how the program may be provided to a personal computer in a recording medium such as a CD-ROM or as a data signal on the Internet or the like.

DESCRIPTION OF PREFERRED EMBODIMENTS

First Embodiment

Figure 1:
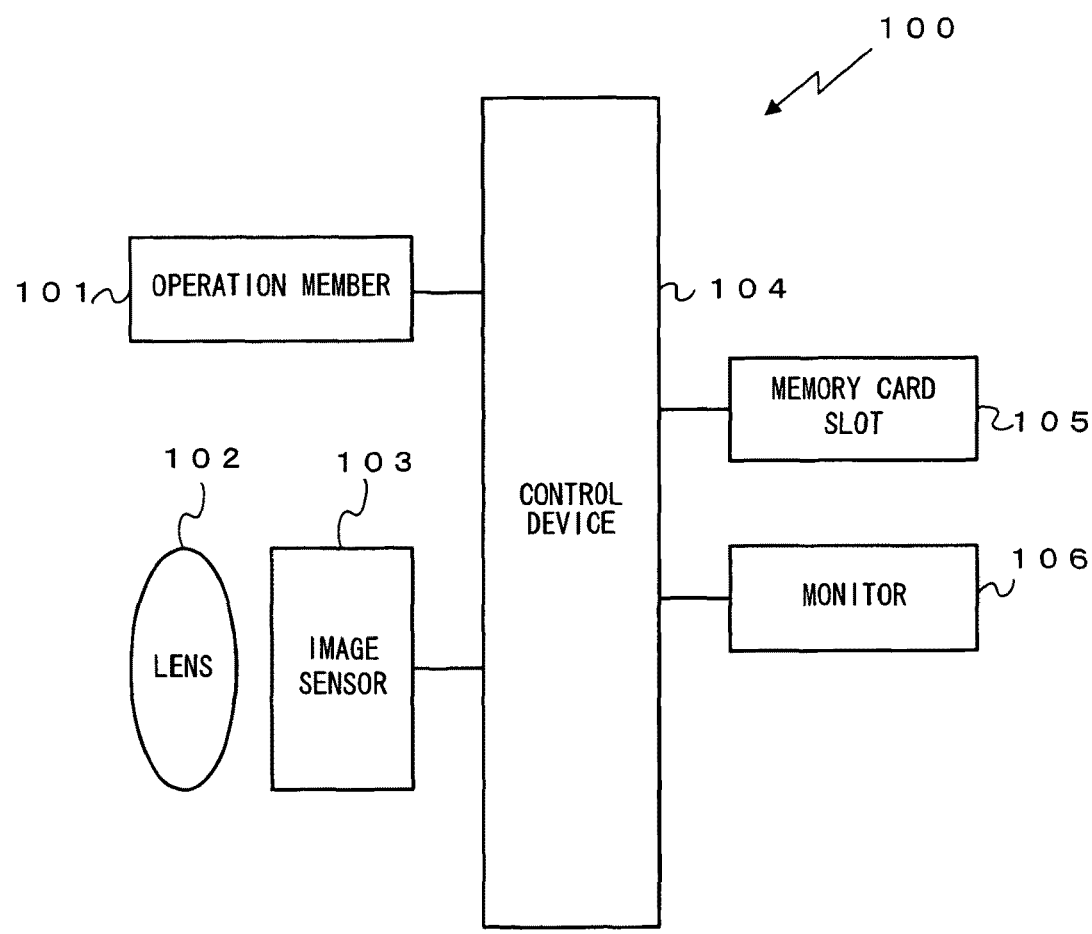
FIG. 1 is a block diagram showing a structure that the camera 100 achieved in a first embodiment may adopt.

FIG. 1 is a block diagram showing a configuration of a camera, which is an embodiment according to the present invention as a subject tracking device or an image matching device. The camera 100 comprises an operation member 101, a lens 102, an image sensor 103, a control device 104, a memory card slot 105 and a monitor 106. The operation member 101 includes various input members operated by the user, wherein the members are such as a power button, a shutter release button, a zoom button, across-key button, a confirm button, a reproduce button and a delete button, and the like.

While the lens 102 is constituted with a plurality of optical lenses, the plurality of optical lenses are represented by a single lens in FIG. 1. The image sensor 103, configured with, for instance, a CCD sensor or a CMOS sensor, captures a subject image formed via the lens 102 and outputs image signals expressing the captured image to the control device 104.

The control device 104 generates image data (hereafter referred to as "main image data") assuming a predetermined image format such as the JPEG format based upon the image signals input thereto from the image sensor 103. In addition, the control device 104 generates display image data, e.g., thumbnail image data, based upon the image data it has generated. The control device 104 further generates an image file that contains the main image data and the thumbnail image data having been generated with header information appended thereto, and outputs the image file to the memory card slot 105.

At the memory card slot 105 where a memory card used as a storage medium is loaded, the image file output from the control device 104 is recorded as it is written into the memory card. In addition, in response to an instruction issued by the control device 104, an image file stored in the memory card is read at the memory card slot 105.

A monitor 106 is a liquid crystal monitor (rear-side monitor) mounted at the rear side of the camera 100, on which an image stored in the memory card, a set up menu by which the camera 100 is set up, or the like, are displayed. In addition, as the user sets the camera 100 in a photographing mode, the control device 104 outputs to the monitor 106 the image data for display of the images obtained from the image sensor 103 in time series. As a result, a live image (a through image) is brought up on display at the monitor 106.

The control device 104, comprising a CPU, a memory and other peripheral circuits, controls the camera 100. It is to be noted that the memory comprised in the control device 104 includes SDRAMs and flash memories. The SDRAMs, which are volatile memories, are used as work memories where programs are loaded when the CPU executes the programs, or as buffer memories where data are temporarily recorded. In the flash memories, which are non-volatile memories, the data related to the programs executed by the control device 104, various parameters that are read at the time of program execution and the like are recorded.

In the present embodiment, the control device 104 executes template matching processing for each frame of the live images (the through images) input from the image sensor 103, by using a template image prepared in advance, so as to identify in each frame an image area, which is similar to the template image. The control device 104 executes subject tracking processing by tracking the image area thus identified from frame to frame.

Figure 2:
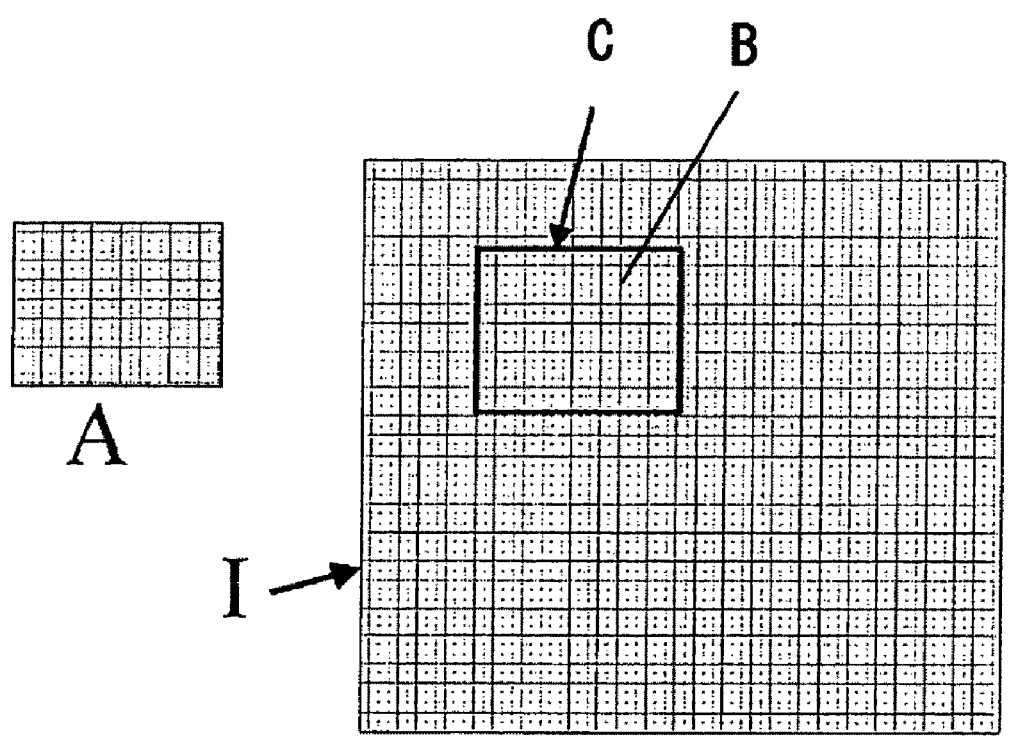
FIG. 2 presents a specific example of a template image A, an image I and a target image B in reference to which the first embodiment is described.

In more specific terms, the control device 104 executes matching calculation for the template image used as a reference image in the template matching processing and each of the sequential image frames input in time series from the image sensor 103. For instance, the control device 104 may identify a specific subject position within an image I by using a template image A, as shown in FIG. 2. The template image A used in this situation will have been obtained in advance based upon an instruction issued by the user. For instance, as the first frame of the live image is brought up on display at the monitor 106, the user may operate the operation member 101 to specify an area within the first frame containing a tracking target subject to be tracked from frame to frame. The control device 104 extracts the image within the area specified by the user as a template image A and stores the template image A into the SDRAM.

Following the start of live image input from the image sensor 103, the control device 104 sets a target window C taking up an area matching the size of the template image at a specific position within each frame I and designates an image B within the target window C thus set as the template matching target. The control device 104 shifts the position of the target window C within the image I and executes the matching calculation for the target image B contained within the target window C at each position in reference to the template image A. Then, based upon the matching calculation results, the control device identifies a subject position represented by the coordinate values indicating the position of the match area, achieving the highest level of similarity between the template image A and the target image B, within the image I.

It is to be noted that the control device 104 may execute the template matching processing over a predetermined range (within a search target area) that includes the position at which the template image A has been extracted from the image, instead of over the entire image I. In such a case, the template matching area can be limited to an area where the subject is likely to be present within the image I, and thus, the processing can be completed more quickly. The present embodiment is described by assuming that the control device 104 executes the template matching processing over a search target area set within the image I.

In the description of the present embodiment, a notation system "$A_{mn}$", with A representing the template image A, m representing the horizontal (lateral) pixel position and n representing the vertical (longitudinal) pixel position within the template image A, is used to indicate each specific pixel in the template image A. For instance, A11 indicates the pixel assuming the upper left corner position within the template image A. In addition, a notation system "$B_{mn}$", with B representing the target image B, m representing the horizontal (lateral) pixel position and n representing the vertical (longitudinal) pixel position within the target image B, is used indicate each specific pixel in the target image B. For instance, $B_{11}$ indicates the pixel assuming the upper left corner position within the target image B.

The template matching processing is normally executed through a Sequential Similarity Detection Algorithm of the known art or the like. In the Sequential Similarity Detection Algorithm, a similarity value r is calculated based upon the residual sum as expressed in (1) below and then the template matching processing is executed based upon the similarity value r thus calculated. When the similarity value r calculated as expressed in (1) is smaller, a higher level of similarity exists between the template image A and the target image B, whereas when the similarity value is greater, the level of similarity between the template image A and the target image B is lower.

$$r = \sum_m \sum_n |A_{mn} - B_{mn}| \tag{1}$$

Assuming that the template image A and the target image B in the present embodiment are both constituted of image data expressed in the YCbCr colorimetric system (color space)

made up with a luminance (brightness) component Y and chrominance (color difference) components Cb and Cr, the control device 104 calculates a similarity value r based upon Y component values as expressed in (1), calculates a similarity value r based upon Cb component values as expressed in (1) and calculates a similarity value r based upon Cr component values as expressed in (1). Then, it calculates a similarity value indicating the level of similarity between the template image A and the target image B, represented by the sum of the similarity value r having been calculated based upon the Y component values, the similarity value r having been calculated based upon the Cb component values and the similarity value r having been calculated based upon the Cr component values.

It is to be noted that while the difference between the value indicated at a given pixel in the template image A and the value indicated at the corresponding pixel in the target image B is determined and the similarity value is calculated as the total sum of the differences corresponding to the overall images in expression (1), the difference is determined in correspondence to each block instead of each pixel in the present embodiment. Namely, the control device 104 in the present embodiment divides both the template image A and the target image B into a plurality of blocks, determines the difference between the Y component average value in each block in the template image A and the Y component average value in the corresponding block in the target image B (the difference between the Y component average values calculated for blocks assigned with matching block numbers, as explained later in reference to FIG. 3A), the difference between the Cb component average values and the difference between the Cr component average values and calculates the similarity value as the total sum of the differences having been calculated in correspondence to the individual blocks making up the entire images.

In more specific terms, the control device 104 divides both the template image A and the target image B into a plurality of blocks (areas) as shown in FIG. 3A. For instance, both the template image A and the target image B may take up a 9×9 pixel area. In such a case, the control device may divide the template image A and the target image B, each into nine blocks each taking up a 3×3 pixel area. It is to be noted that in the description of the present embodiment, each block is referred to by quoting the corresponding number indicated in FIG. 3A. For instance, the block located at the upper left corner is referred to as block 1.

The control device 104 calculates Y component average values, Cb component average values and Cr component average values in correspondence to the individual blocks making up the template image A and the target image B. Namely, it calculates the Y component average value, the Cb component average value and the Cr component average value in correspondence to each of block 1 (the block located at the upper left corner in FIG. 3A) through block 9. In the example presented in FIG. 3B, the Y component average value is calculated to be 76, the Cb component average value is calculated to be 113 and the Cr component average value is calculated to be 143 in correspondence to block 1, i.e., the block located at the upper left corner.

The template matching processing is typically executed by the control device 104 by calculating the similarity values r for the various components as expressed in (1) based upon the Y component average values, the Cb component average values and the Cr component average values calculated in correspondence to the individual blocks making up the template image A and the target image B, as described earlier, and calculating the similarity value indicating the level of similarity between the template image A and the target image B, represented by the total sum of the similarity values r.

When the template image A and the target image B are each divided into a plurality of blocks, the Y component average values, the Cb component average values and the Cr component average values are calculated in correspondence to the individual blocks and template matching is executed based upon the average values as described above, a change in the image brightness which is likely to affect the way the Y component value fluctuates, may lower the template matching accuracy.

For instance, the Y component average values calculated for a dark image photographed in a shady location, such as that shown in FIG. 4A, and the Y component average values calculated for a bright image photographed in a sunny location such as that shown in FIG. 4B, greatly differ from each other, as indicated in FIGS. 4C and 4D. It is to be noted that FIG. 4C lists the Y component average values, the Cb component average values and the Cr component average values calculated for an area 4a within the dark image shown in FIG. 4A. In addition, FIG. 4D lists the Y component average values, the Cb component average values and the Cr component average values calculated for an area 4b within the bright image shown in FIG. 4B.

As FIGS. 4C and 4D clearly indicate, by comparing the average values of Y component, Cb component, and Cr component for each block in FIG. 4C, with those values for a corresponding block in FIG. 4D, there is no significant difference between the average values of Cb component or Cr component, while there is a considerable difference between the Y component average values. The significant difference between the Y component average values is attributable to the difference between the brightness of the image within the area 4a in FIG. 4A and the brightness of the image within the area 4b in FIG. 4B.

Under these circumstances, the similarity value calculated by the control device 104 as described above for the template image A contained in the area 4a in FIG. 4A and the target image B contained in the area 4b in FIG. 4B, which is represented by the total sum of the similarity values calculated as expressed in (1) in correspondence to the various components, is bound to be a large value due to the influence of the Y component. In other words, even though the level of similarity between the subject within the template image A and the subject within the target image B is actually high, an erroneous decision will be made that the similarity level is low due to the difference in the image brightness.

In order to effectively address this issue, the control device 104 in the present embodiment minimizes the discrepancy in the Y component calculation results obtained in correspondence to the individual blocks, which is attributable to a change in the image brightness, by normalizing the template image A and the target image B and by executing template matching for the normalized target image B with the normalized template image A.

The following is a description of normalization processing executed to normalize the template image A and the target image B. The control device 104 normalizes the template image A and the target image B, in a way that from the average Y component values of individual blocks of 9 blocks in the template image A and the target image B are subtracted the average Y component values of one predetermined block of 9 blocks in the image A and the image B, respectively. For instance, the control device 104 may normalize the template image A and the target image B each by designating block 5 as a reference area and subtracting the Y component average value calculated for block 5 from the Y component average values calculated for blocks 1 through 9.

FIGS. 5A and 5B respectively present the results obtained by normalizing the calculation results in FIG. 4C through the method described above and the results obtained by normalizing the calculation results in FIG. 4D through the method described above. Normalization is achieved in FIG. 5A by subtracting the Y component average value (106) corresponding to block 5 in FIG. 4C from the Y component average values calculated for all the blocks. For instance, the Y component average value for block 1 is normalized to a value of −30 (76−106=−30) in FIG. 5A. Similarly, the Y component average value for block 2 is normalized to a value of 21 (127−106=21). The Y component average values for blocks 3~9, too, are normalized in this manner.

Normalization is achieved in FIG. 5B by subtracting the Y component average value (148) corresponding to block 5 in FIG. 4D from the Y component average values calculated for all the blocks. For instance, the Y component average value for block 1 is normalized to a value of −27 (121−148=−27) in FIG. 5B. Similarly, the Y component average value for block 2 is normalized to a value of 22 (170−148=22). The Y component average values for blocks 3~9, too, are normalized in this manner.

By normalizing the Y component average value calculation results obtained in correspondence to the individual blocks making up both the template image A and the target image B as described above, the differences between the Y component average values calculated for the corresponding blocks in the two images can be reduced. Consequently, the Y component similarity value r indicating the level of Y component similarity between the template image A and the target image B can be calculated as expressed in (1) with a high level of accuracy by eliminating the influence caused by the difference between the brightness levels of the images.

For instance, the Y component similarity value is calculated as expressed in (1), based upon the Y component average value calculation results presented in FIGS. 4C and 4D, as follows; r=|76−121|+|127−170|+ . . . +|107−159|=370. However, the Y component similarity value is calculated as expressed in (1), based upon the normalized Y component average value calculation results presented in FIGS. 5A and 5B, as follows; r=|−30−(−27)|+|21−22|+ . . . +|1−11|=76. Thus, the Y component similarity value r calculated as expressed in (1) based upon the normalized results is much smaller than that based upon non-normalized results, thereafter providing higher level of Y component similarity calculated by using the normalized Y component average values.

Furthermore, the similarity value representing the sum of the similarity values calculated for all the components, Y, Cb and Cr, as expressed in (1), is 538 for the non-normalized images in FIGS. 4C and 4D, and is 244 for the normalized images in FIGS. 5A and 5B. In short, by using the normalized template image A and the normalized target image B with the Y component average value calculation results corresponding to the individual blocks having been normalized in the template matching processing, as described above, the influence caused by the difference in the image brightness is eliminated and the template matching accuracy can thus be improved.

It is to be noted that the ratio of the Y component similarity to the overall similarity value calculated by incorporating similarity values for all the components in the non-normalized state in FIGS. 4C and 4D is 370/538=0.69. In other words, the ratio of the Y component similarity value is high, at 70%. In contrast, the ratio of the Y component similarity value in the normalized state in FIGS. 5A and 5B is 76/244=0.31. Namely, the ratio of the Y component similarity value after normalization is approximately 30%, which is quite reasonable.

Figures 6A, 6B, 6C:
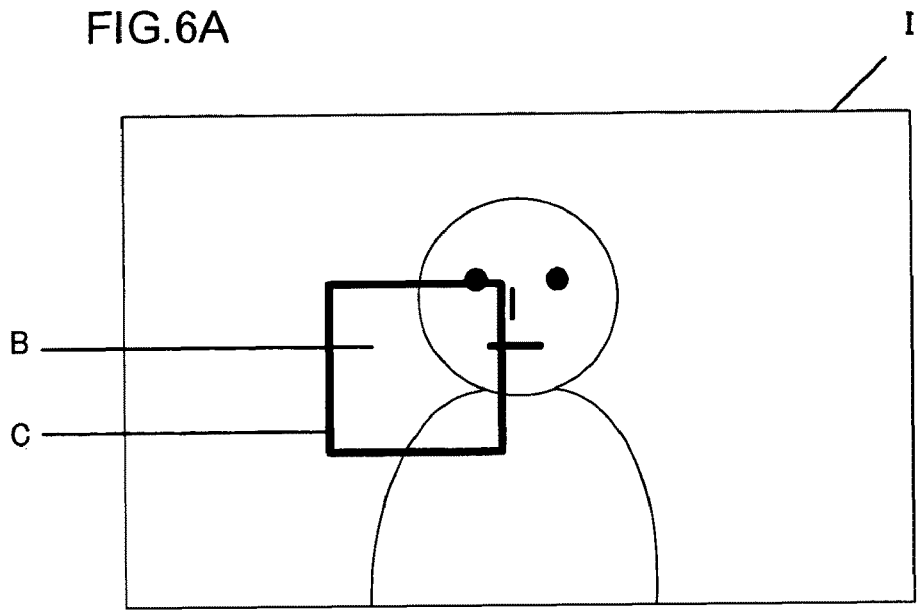
FIGS. 6A through 6C demonstrate the difference between the template matching results in the first embodiment, wherein the results obtained are with normalizing calculation of the Y component and without normalizing calculation of the Y component, when the target window C is slightly offset from the person's face.

Now, in reference to FIGS. 6A~6C, an explanation is given on specifically how the normalization of the template image A and the target image B alters the template matching results. The results of the template matching processing executed for the image I shown in FIG. 4B by using the template image A in FIG. 4A should indicate the highest level of similarity between the template image and the target image B that includes the person's face in FIG. 4B, and such results are obtained by normalizing the Y average value calculation results as has been explained in reference to FIGS. 5A and 5B.

FIG. 6B lists the Y component average values, the Cb component average values and the Cr component average values calculated for the individual blocks in conjunction with the target window C slightly offset from the person's face, as shown in FIG. 6A when the Y component average value calculation results are not normalized. The overall similarity value calculated by incorporating the similarity values for all the components, Y, Cb and Cr with the data presented in FIG. 6B is 526, which is smaller than the similarity value 538 calculated by using the data in FIGS. 4C and 4D. In other words, the similarity value calculated by using the data in FIG. 6B indicates a higher level of similarity than the similarity value calculated based upon the data in FIGS. 4C and 4D.

Thus, while the similarity value indicating the highest level of similarity should be calculated when the face of the person to be tracked by using the template image A (area 4a) is contained within the target window C as shown in FIGS. 4A and 4B, the similarity value indicating the highest level of similarity would be calculated for the target window C slightly offset from the person's face, as shown in FIG. 6A, due to the change in the image brightness.

FIG. 6C lists the Y component average values, the Cb component average values and the Cr component average values calculated for the individual blocks with the target window C slightly offset from the person's face, as shown in FIG. 6A, when the Y component average value calculation results are normalized. The overall similarity value calculated by incorporating the similarity values for all the components, Y, Cb and Cr with the data presented in FIG. 6C is 524, which is larger than the similarity value 244 calculated by using the data in FIGS. 5A and 5B. In other words, the similarity value calculated by using the data in FIG. 6B does not indicate a higher level of similarity than the similarity value calculated based upon the data in FIGS. 5A and 5B.

As described above, by normalizing the template image A and the target image B, it is ensured that a similarity value indicating a misleadingly high level of similarity is never calculated for a target image B that does not actually have a high level of similarity to the template image A, even when the image brightness changes. As a result, even if the brightness of the template matching target image I is different from the brightness of the image for which the template matching is carried out, the template matching processing can be executed accurately.

Figure 9:
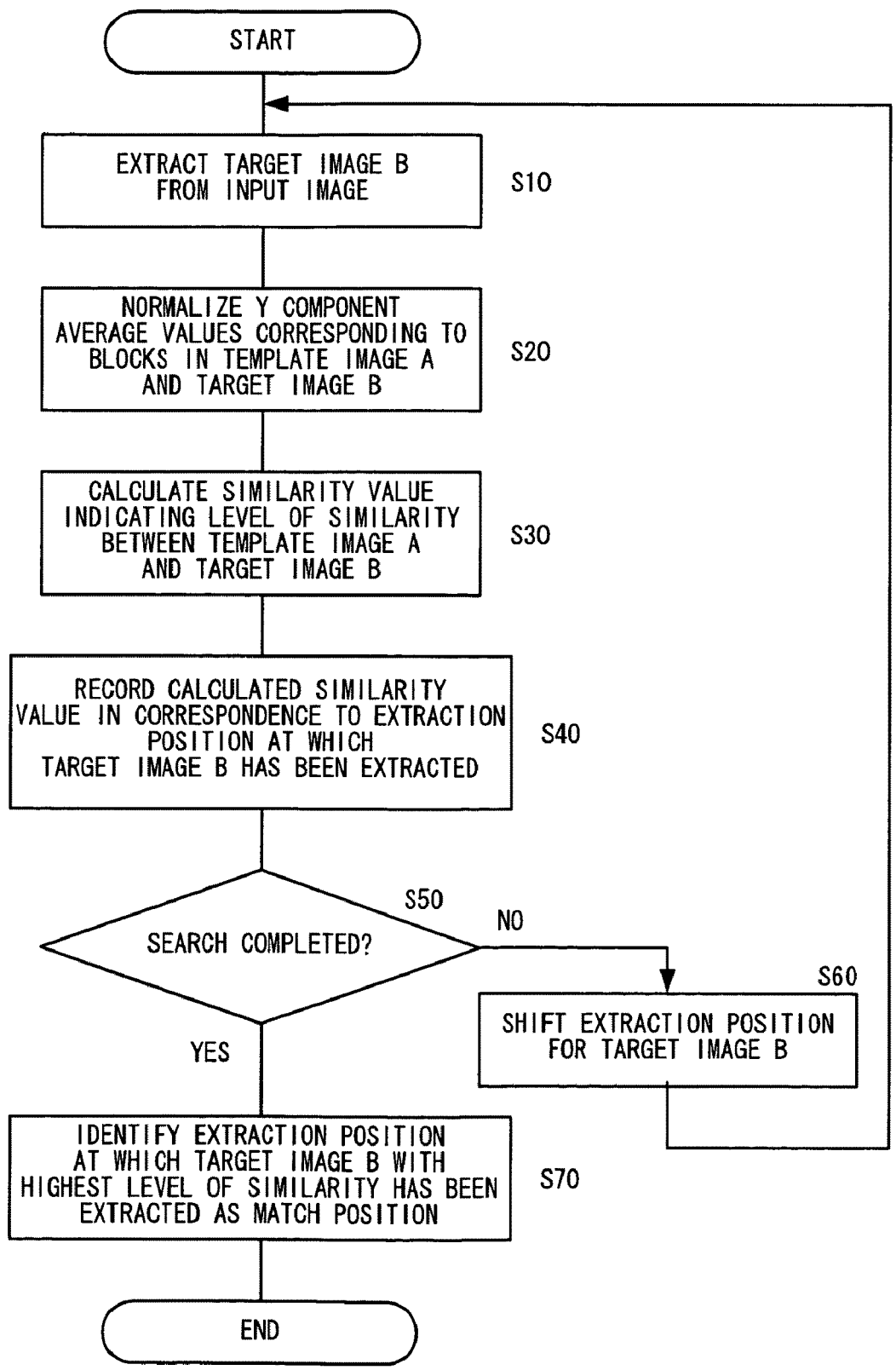
FIG. 9 presents a flowchart of the template matching processing executed in the first embodiment.

FIG. 9 presents a flowchart of the template matching processing executed in the present embodiment. The processing in FIG. 9 is executed by the control device 104 based upon a program started up as image data originating from the image sensor 103 are input. It is assumed that a template image containing the tracking target subject, to be used in the template matching processing, is obtained in advance and is recorded in the SDRAMs used as a buffer memory.

In step S10, the control device 104 sets the target window C within the search target area in the input image I and extracts the image area within the target window C as the target image B. The operation then proceeds to step S20.

In step S20, the control device 104 divides the template image A and the target image B into nine blocks each and calculates the Y component average values, the Cb component average values and the Cr component average values in correspondence to the individual blocks, as explained earlier. Then, the control device 104 normalizes the Y component average values having been calculated, and the operation proceeds to step S30.

In step S30, the control device 104 calculates the similarity values r for the various components as expressed in (1) based upon the normalized Y component average values, the Cb component average values and the Cr component average values corresponding to the individual blocks. Then, the control device 104 calculates the similarity value indicating the level of similarity between the template image A and the target image B by adding up the similarity values r having been calculated for the various components. The operation subsequently proceeds to step S40.

In step S40, the control device 104 records the extraction position at which the target image B has been extracted within the current input image and the similarity value having been calculated in step S30, both of which are related to each other, into the SDRAMs, and then the operation proceeds to step S50.

In step S50, the control device 104 makes a decision as to whether or not the search has been completed with the target window C having been moved to cover the entire range of the search target area, i.e., whether or not template matching processing has been executed over the entire range of the search target area.

If a negative decision is made in step S50, the operation proceeds to step S60. In step S60, the control device 104 switches the target image extraction position by shifting the position of the target window C within the search target area. The operation then returns to step S10 to repeat the processing described above.

If an affirmative decision is made in step S50, the operation proceeds to step S50. In step S70, the control device 104 reads out from the SDRAM the similarity values calculated at the various target image extraction positions having been recorded in step S40 and identifies the similarity value indicating the highest level of similarity among all the similarity values, i.e., the smallest similarity value. The control device 104 then designates the extraction position at which the target image B, for which the smallest similarity value has been calculated, as a template match position achieving a match with the template image A, before ending the processing.

It is to be noted that the control device 104 is able to track the subject from one frame to another by repeatedly executing the processing in FIG. 9 on image data input from the image sensor 103 in time series.

The following advantages are achieved through the embodiment described above.

(1) The control device 104 divides the template image A and the target image B each into a plurality of areas (blocks), calculates the luminance (Y component) average of the luminance values indicated at the pixels making up each block and the chrominance (Cb component and Cr component) averages of the chrominance values indicated at the pixels making up each block, and individually normalizes the Y component average values corresponding to the various blocks. The control device 104 then executes template matching processing based upon the normalized Y component average values, the Cb component average values and the Cr component average values corresponding to the blocks making up the template image A, and upon the normalized Y component average values the Cb component average values and the Cr component average values corresponding to the blocks making up the target image B. As a result, even when the brightness of the target image B does not match the brightness of the template image A, accurate template matching processing can be executed.

(2) The control device 104 normalizes the Y component average values corresponding to the various blocks by designating a specific block among the blocks as a reference area and subtracting the Y component average value calculated for the reference area from the Y component average values in the nine blocks. As a result, Y component average value calculation results unaffected by the difference between the brightness of the template image A and the brightness of the target image B can be obtained.

-Variations-

It is to be noted that the camera achieved in the embodiment described above allows for the following variations.

Figures 7A, 7B, 7C, 7D, 7E:
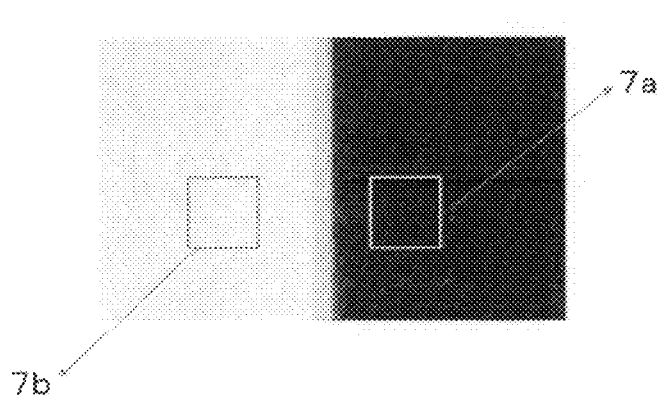
FIGS. 7A through 7E present a first specific example in the first embodiment for a whitish area and a blackish area, showing their Y component average values, the Cb component average values, the Cr component average values and the normalized Y component average values.

(1) In the embodiment described above, the template matching processing is executed by calculating similarity values each in correspondence to one of the three components, i.e., Y, Cb and Cr. The following problem is bound to occur if template matching is executed for the blackish area 7a and the whitish area 7b in FIG. 7A through this method. FIG. 7B lists the Y component average values, the Cb component average values and the Cr component average values calculated for the various blocks in the area 7a, whereas FIG. 7C lists the Y component average values, the Cb component average values and the Cr component average values calculated for the various blocks in the area 7b. As FIGS. 7B and 7C indicate, the Y component average values calculated for the individual blocks in either area 7a or 7b are not different. Hence, if the Y component average values are normalized through the method described earlier, the normalized Y component averages (Y differences) will invariably assume values close to 0, as indicated in FIGS. 7D and 7E. In addition, since the images contained in the area 7a and the area 7b are both achromatic images, the Cb component averages and the Cr component averages calculated for the individual blocks all assume values close to 128 to indicate achromatic color.

As a result, while the level of similarity between the image in the area 7a and the image in the area 7b is actually low, due to lack of difference among the normalized Y component average values corresponding to the individual blocks, among the Cb component average values calculated for the individual blocks and the Cr component average values calculated for the individual blocks, it is not possible to distinguish the area 7a from the area 7b based upon these values, and the level of similarity between the two areas will be erroneously determined to be high.

Even under such circumstances, the achromatic images in the area 7a and the area 7b can be distinguished from each other through template matching executed by taking into consideration the significant difference between the Y component average values calculated for the individual blocks in the area 7a and the Y component average values calculated for the individual blocks in the area 7b as listed in FIGS. 7B and 7C. Namely, the problem discussed above can be solved by executing template matching processing based upon the Y component average values, the normalized Y component average values, the Cb component average values and the Cr component average values in FIG. 8A corresponding to the individual blocks in the area 7a and the Y component average values, the normalized Y component average values, the Cb component average values and the Cr component average values in FIG. 8B for the individual blocks in the area 7b.

(2) In the embodiment described above, the control device 104 normalizes the template image A and the target image B by dividing the template image A and the target image B into nine areas each and normalizing the Y component average value calculation results obtained in correspondence to the nine target blocks. However, the number of blocks into which the template image A and the target image B may be divided by the control device 104 does not need to be nine. In addition, while the template image A and the target image B each range over a 9×9 pixel area and each of the blocks into which the template image A and the target image B are divided ranges over a 3×3 pixel area in the example described above, the a real size of the template image A and the target image B and the a real size of the blocks into which the template image and the target image are divided are not limited to those.

(3) The control device 104 in the embodiment described above divides the template image A and the target image B each into nine blocks, calculates the Y component average value for each of the blocks making up the template image A and the target image B by dividing the sum of the Y component values indicated at the individual pixels by the number of pixels, and also calculates the Cb component average value and the Cr component average value each by dividing the sum of the corresponding values indicated at the individual pixels by the number of pixels in a similar manner. However, the Y component average value, the Cb component average value and the Cr component average value for each of the blocks making up the template image A and the target image B may instead each be calculated by dividing the sum of the values representing the particular component and indicated at the individual pixels by a numerical value other than the number of pixels. For instance, the sum of the pixel values may be divided by a numerical value such as 3 or 5, i.e., a numerical value other than 9 representing the number of pixels in each block.

In addition, while the control device 104 uses the pixel values indicated at all the pixels in the block, i.e., the nine pixels, when calculating the average value in the example described above, the average value may instead be calculated by designating only some of pixels in the block as average value calculation targets. For instance, assuming that each block is made up with nine pixels, the control device 104 may designate a majority of the pixels in the block, e.g., five pixels for the average value calculation and calculate the average values corresponding to the various components by using the pixel values indicated at the five pixels. In such a case, too, the average values may each be calculated by dividing the sum of the pixel values for the particular component indicated at the five pixels by, for instance, 2 or 3, instead of 5.

(4) An explanation is given above in reference to the embodiment on an example in which the control device 104 calculates the Y component average value, the Cb component average value and the Cr component average value in correspondence to each of the blocks making up the template image A and each of the blocks making up the target image B. However, as an alternative, the control device 104 may calculate sums or medians instead of the average values. Namely, the control device 104 may calculate the sum of the Y component values, the sum of the Cb component values and the sum of the Cr component values indicated at the individual pixels within each of the blocks making up the template image A and the target image B.

Or the control device 104 may calculate the median of the Y component values, the median of the Cb component values and the median of the Cr component values indicated at the individual pixels in each block among the blocks making up the template image A and the target image B. In either case, the control device 104 should execute template matching processing by normalizing the Y component sums or the Y component medians instead of normalizing the averages. The average values, the sums and the medians are all representative values representing the Y component values, the Cb component values and the Cr component values in the individual blocks.

(5) While the Y component values in the template image and the Y component values in the target image are both normalized in the embodiment described above, the data representing the change in the brightness alone may be corrected as an alternative. Namely, in the case of the example presented in FIGS. 4A through 4D, data may be adjusted so that equal Y component values are assumed in areas 5, designated as the referenced areas in the embodiment described earlier, in the template image and the target image. More specifically, the Y component value of 148 calculated for area 5 in the target image (see FIG. 4D) should be adjusted to 106, i.e., the Y component value calculated for area 5 in the template image (see FIG. 4C). Then, the Y component values corresponding to all the areas, i.e., areas 1~9, in the target image (see FIG. 4D) should be uniformly multiplied by 106/148. Template matching can be executed through this alternative template matching method without compromising the template matching accuracy even when the brightness of the target image is altered relative to the brightness of the template image.

(6) While an explanation is given above in reference to the embodiment on an example in which the photographic subject is tracked through pattern matching processing executed in the camera 100, the processing described above may be executed at a personal computer or the like. For instance, the present invention may be adopted in a personal computer capable of reproducing a video image to execute template matching processing by designating each of the frames constituting the video image as the target image and using a template image prepared in advance.

Second Embodiment

The following is a description of the second embodiment. Since the camera achieved in the second embodiment assumes a structure similar to that of the camera in the first embodiment, a repeated explanation is not provided. The embodiment is described by quoting as needed FIGS. 1 through 5B, in reference to which the first embodiment has been described.

As does the control device in the first embodiment, the control device 104 in the second embodiment executes specific processing designed to sustain the acceptable level of template matching accuracy even when the Y component average values are altered due to a change in the image brightness. In more specific terms, the control device 104 calculates the similarity values r only after eliminating the influence caused by the change in the image brightness, by normalizing the Y component average values.

In the second embodiment, the optimal template matching processing is enabled even when both the template image A and the target image B take on hues that are close to being achromatic. The processing executed in the embodiment is now described in detail.

The template image A and the target image B are each normalized by the control device 104, which normalizes the Y component average values by designating as a reference value the Y component average value calculated for a specific block among the Y component average values calculated in correspondence to the individual blocks in the particular image and subtracting the reference value from the Y component average values in all the blocks, so as to eliminate the influence caused by the change in the image brightness on the Y component average values. Assuming that Y1 and Y2, for instance, respectively represent the Y component average value in a first block and the Y component average value in a second block and that normalization is executed with the Y component average value Y5 in a fifth block designated as the reference value, the control device 104 normalizes each image as expressed in (2) below.

$$Y_{1-9} = Y_{1-9} - Y_5 \quad (2)$$

FIG. 5A represents the results obtained by normalizing, as expressed in (2), the Y component average values in the individual blocks indicated in FIG. 4C. FIG. 5B represents the results obtained by normalizing, as expressed in (2), the Y component average values in the individual blocks as indicated in FIG. 4D. As FIGS. 5A and 5B clearly indicate, the difference between the Y component average values in each pair of blocks assigned with the matching block numbers is greatly reduced through the normalization.

After normalizing the Y component average values in the individual blocks in the template image A and the target image B, the control device 104 calculates the similarity values r, as expressed in (1), based upon the average values representing the various components the individual blocks, as explained earlier. For instance, the actual numerical calculation executed as expressed in (1) based upon the normalized Y component average values in FIGS. 5A and 5B to determine the Y component similarity value r, indicating the level of Y component similarity between the image contained in the area 4a in FIG. 4A, extracted as the template image A, and the image contained in the area 4b in FIG. 4B extracted as the target image B, written as follows in (3) below.

$$r = |-30-(-27)| + |21-22| + |-10-(-17)| + |-17-(-29)| + |0-0| + |-4-(-27)| + |-10-4| + |-9-(-3)| + |1-11| = 76 \quad (3)$$

In contrast to the above calculation, based upon the non-normalized Y component average values, the Y component similarity value r, indicating the level of Y component similarity between the image contained in the area 4a in FIG. 4A, extracted as the template image A, and the image contained in the area 4b in FIG. 4B designated as the target image B, is calculated as expressed in (1) based upon the Y component average values in FIGS. 4C and 4D through numerical calculation (4) below.

$$r = |76-121| + |127-170| + |96-131| + |89-119| + |106-148| + |102-121| + |96-152| + |97-145| + |107-159| = 370 \quad (4)$$

As the calculation results for the similarity value r in (3) and the calculation results for the similarity value r in (4) clearly indicate, a similarity value r indicating a low level of similarity between the template image A and the target image B is calculated (a large similarity value r is calculated) through the calculation in (4), whereas a similarity value indicating a high level of similarity between the two images is calculated (a small similarity value r is calculated) through the calculation in (3). In other words, even though the level of similarity between subjects photographed in the template image A and the template image B assuming different levels of brightness is actually high, the similarity value r calculated for the two images based upon the Y component average values without first normalizing the Y component average values is bound to indicate a low level of similarity.

Thus, the overall similarity value determined for the two images by calculating the similarity value r, where the similarity value r is calculated based on the Y component average values, Cb component average values, and Cr component average values after the expression (1), is 244 in the case where the normalized Y component average values as in the FIGS. 5A and 5B are used, and is 538 in the case where the non-normalized Y component values as in the FIGS. 4C and 4D are used. This means that by first normalizing the Y component average values before calculating the overall similarity value indicating the level of similarity between the two images, the accuracy of the template matching operation can be improved by eliminating the influence caused by the change in the image brightness.

It is to be noted that while the method described above, whereby the influence caused by the change in the image brightness is eliminated by first normalizing the Y component average values and then calculating the overall similarity value is highly effective as long as the template image A and the target image B are both chromatic images, additional measures must be taken if the template image A and the target image B are substantially achromatic images.

A decision as to whether or not the template image A and the target image B are substantially achromatic images may be made as follows. For instance, the image shown in FIG. 10A includes substantially achromatic image areas 6a and 6b respectively containing an image of dark hair and an image of a white wall and a chromatic image area 6c containing an image of clothing. It is to be noted that the areas 6a-6c each range over a 9×9 pixel area, as shown in FIG. 3A. FIG. 10B presents the calculation results obtained by determining the absolute differences between the Cb component values indicated at the individual pixels within the area 6a and the value of 128, which represents achromatic color. FIG. 10C presents the calculation results obtained by determining the absolute differences between the Cr component values indicated at the individual pixels within the area 6a and the value of 128, which represents achromatic color.

FIG. 10D presents the calculation results obtained by determining the absolute differences between the Cb component values indicated at the individual pixels within the area 6b and the value of 128, which represents achromatic color. FIG. 10E presents the calculation results obtained by determining the absolute differences between the Cr component values indicated at the individual pixels within the area 6b and the value of 128, which represents achromatic color. FIG. 10F presents the calculation results obtained by determining the absolute differences between the Cb component values indicated at the individual pixels within the area 6c and the value of 128, which represents achromatic color. FIG. 10G presents the calculation results obtained by determining the absolute differences between the Cr component values indicated at the individual pixels within the area 6c and the value of 128, which represents achromatic color.

As FIGS. 10B through 10E indicate, the absolute differences between the chrominance component values (Cb component values, Cr component values) at the individual pixels within the area and the numerical value of 128, which represents achromatic color, invariably assume values close to 0. In contrast, as shown in FIGS. 10F and 10G, the absolute differences between the luminance component values (Y component values) at the individual pixels within the area and the numerical value of 128, which represents achromatic color, all take on significantly large values.

Accordingly, if the absolute differences between the Cb component values or the Cr component values at the pixels within the template image A and the numerical value of 128, which represents achromatic color, do not exceed a predetermined value, e.g., 10, the template image A can be judged to be an achromatic image. Also, if the absolute differences between the Cb component values or the Cr component values at the pixels within the target image B and the numerical value of 128, which represents achromatic color, do not exceed a predetermined value, e.g., 10, the target image B can be judged to be an achromatic image.

FIG. 11B lists the Y component values indicated at the individual pixels within the area 6a in FIG. 10A and FIG. 11A lists the Y component values indicated at the individual pixels within the area 6b in FIG. 10B. As explained earlier, the area 6a contains a substantially achromatic image of dark hair, whereas the area 6b contains a substantially achromatic image of a white wall. Therefore, the similarity value calculated for the area 6a and the area 6b should indicate a low level of similarity. The similarity values calculated as expressed in (1) for the area 6a designated as the template image A and the area 6b designated as the target image B are now examined.

In this situation, as explained above, the control device 104 divides the area 6a (template image A) in FIG. 10A into nine blocks each ranging over a 3×3 pixel area and calculates the Y component average values in correspondence to the individual blocks as indicated in FIG. 11A. Also, the control device divides the area 6b (target image B) in FIG. 10B into nine blocks each ranging over a 3×3 pixel area and calculates the Y component average values, the Cb component average values and the Cr component average values in correspondence to the individual blocks as indicated in FIG. 11B.

Then, as explained above, the control device 104 calculates the similarity values r for the Y component, the Cb component and the Cr component individually as expressed in (1) after normalizing the Y component average values. It is to be noted that the Y component similarity value calculated by normalizing the Y component average values in FIGS. 11A and 11B is 67.33. The Y component similarity value r calculated as expressed in (1) without normalizing the Y component average values in FIGS. 11A and 11B is 993.11. In other words, the similarity value calculated by normalizing the Y component average values indicates a higher level of similarity with regard to the Y component compared to the similarity value calculated without normalizing the Y component average values.

Since there are no substantial differences between the chrominance component values indicated at the various pixels constituting the template image A and the chrominance component values indicated at the various pixels constituting the target image B, as indicated in FIGS. 10B through 10E, the Cb component similarity value r and the Cr component similarity value r are both bound to be small. Thus, the similarity value calculated by adding up the Y component similarity value r calculated based upon the normalized Y component average values, the Cb component similarity value r and the Cr component similarity value r will indicate a high level of similarity between the template image A and the target image B when the template image A and the target image B are both achromatic images.

Namely, even if the template image A and the target image B, which are both substantially achromatic images, are actually completely different from each other, with one image area containing an image of dark hair and the other image area containing an image of a white wall, the similarity value calculated by normalizing the Y component average values will indicate a high level of similarity between the two images. The control device 104 in the embodiment executes the following processing in order to avoid such problematic consequences.

The control device 104 normalizes the Y component average values individually for the template image A and the target image B by designating the Y component average value corresponding to a specific block among the Y component average values calculated for the various blocks as a reference value, multiplying the reference value by a coefficient which is the output value β of the sigmoid function expressed in (5) below and subtracting the product from each of the Y component average values calculated for the individual blocks. For instance, with Y1, Y2, . . . , respectively representing the Y component average value corresponding to the first block, the Y component average value corresponding to the second block and so forth, the control device 104 may normalize the Y component average values as expressed in (6) below by using the Y component average value Y5 corresponding to the fifth block as the reference value.

$$\beta = \frac{1}{1 + e^{-ax+b}} \quad (5)$$

$$Y_{1\sim 9} = Y_{1\sim 9} - \beta \times Y_5 \quad (6)$$

Figure 12:
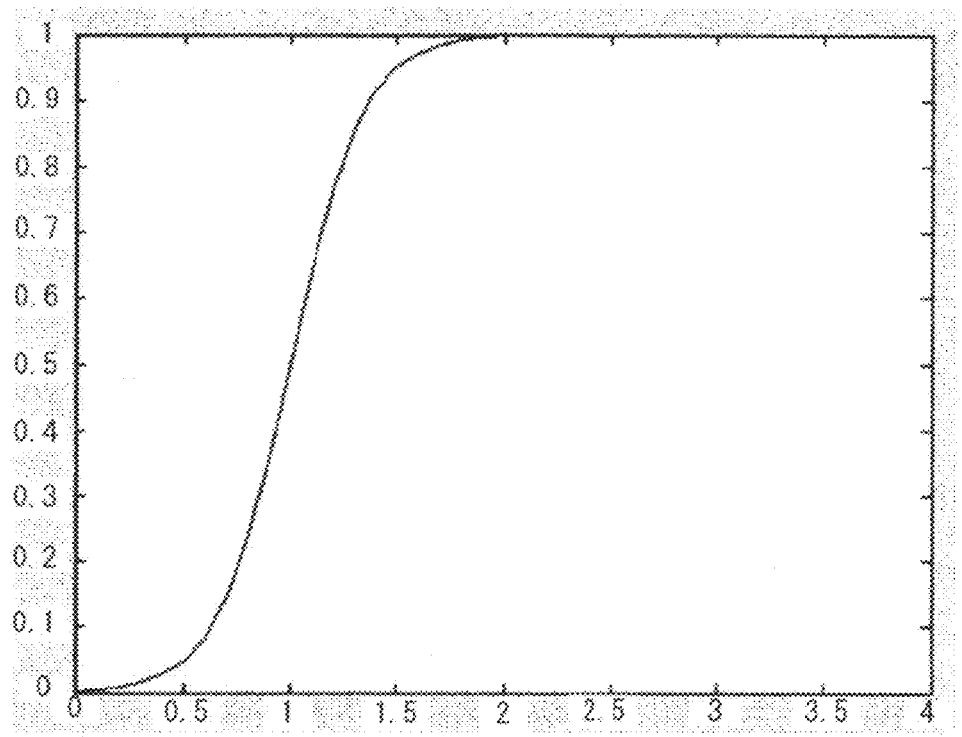
FIG. 12 presents, in the second embodiment, a first specific example of a sigmoid function.

It is to be noted that a sigmoid function is differentiable S-shaped function that continuously outputs the value β within a range of 0 to 1, univocally determined in correspondence to the input value x as shown in FIG. 12. As shown in FIGS. 13A through 13E, the slope of the sigmoid function and the position at which the output value of the sigmoid function starts to come closer to 1, are determined in correspondence to the values set for coefficients a and b. For instance, FIG. 13A shows a sigmoid function with the coefficients a and b respectively set to 6 and 1, FIG. 13B shows a sigmoid function with the coefficients a and b respectively set to 1 and 6 and FIG. 13C shows a sigmoid function with the coefficients a and b both set to 6. In addition, FIG. 13D shows a sigmoid function with the coefficients a and b respectively set to 6 and 11 and FIG. 13E shows a sigmoid function with the coefficients a and b respectively set to 11 and 6. In the present embodiment, the sigmoid function in FIG. 13C with the coefficients a and b both set to 6 is used.

In addition, the input value x is calculated by dividing the value calculated as expressed in (7) below by a predetermined value.

$$\sum_{i=1}^{n} |Cb_i - 128| + \sum_{i=1}^{n} |Cr_i - 128| \quad (7)$$

n: number of pixels in the template

In the present embodiment, x is calculated by dividing the value calculated as expressed in (7) by the number of pixels (81) in the template image A multiplied by 10. The output value β of the sigmoid function set as described above indicates the level of achromaticity of the template image A or the target image B, with β taking on a value closer to 0, indicating that the image is more achromatic (that the level of achromaticity is higher) and β taking on the value of 0 indicating that the image is completely achromatic. In addition, β taking on a value closer to 1 indicates that the image is more chromatic (that the level of achromaticity is lower) and β taking on the value of 1 indicates that the image is completely chromatic.

Figure 14A:
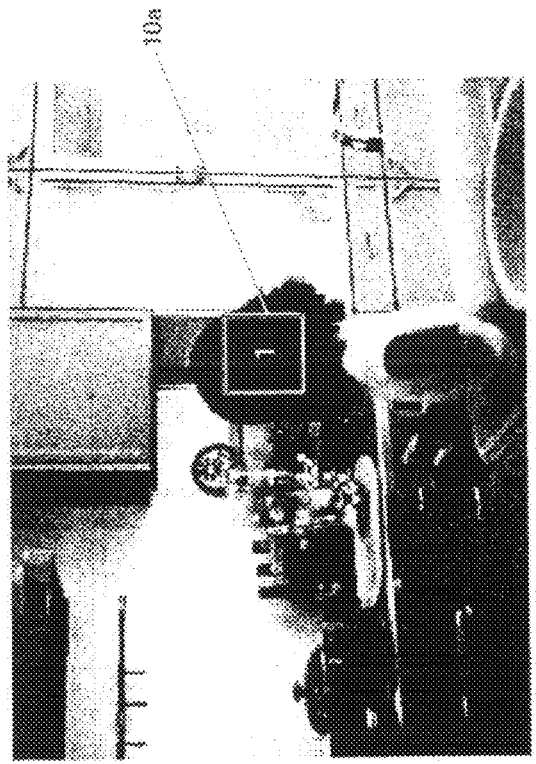

Now, in reference to FIGS. 10A through 10G and FIGS. 11A and 11B, specific examples of the Y component average value normalization executed as expressed in (6) incorporated in the similarity value calculation, are described. It is to be noted that in the examples described below, the areas 6a and 6b in FIG. 10A and the area 10a in FIG. 14A are each designated as the template image A and the control device 104 normalizes the Y component average values for each template image A as expressed in (6).

In the first example, the area 6a in FIG. 10A is designated as the template image A. In this case, the control device 104 calculates the value x by dividing the value calculated as expressed in (7) based upon the values in FIGS. 10B and 10C by the number of pixels 81 in the template image A multiplied by 10. Through the process, x is calculated to be; $x=(55+89)/(81\times10)=0.178$. The control device 104 then determines the output value $\beta$ of the sigmoid function as expressed in (5) by using the value x calculated as described above. The output value $\beta$ calculated as described above to indicate the level of achromaticity is 0.0072. Since the template image A extracted from the area 6a containing the image of dark hair is a substantially achromatic image, as explained earlier, $\beta$ takes on a value close to 0.

Based upon the value $\beta$ having been calculated as described above, the control device 104 normalizes the Y component average values corresponding to the various blocks constituting the template image A as expressed in (6). Since $\beta$ takes a value close to 0, in this case, when the template image A is a substantially a chromatic image, the value obtained by multiplying the reference value, i.e., the Y component average value Y5 corresponding to the fifth block by is smaller than the initial reference value and thus, it is ensured that the value to be subtracted from the Y component average values corresponding to the individual blocks is smaller than the initial reference value.

Thus, through the processing executed for the template image A which is a substantially achromatic image, the Y component average values are normalized so as to settle the problem of the change in the brightness and also the Y component similarity is still taken into account to influence the calculation of the ultimate similarity value so as to sustain the desirable level of template matching accuracy even when another achromatic image is matched against the template image A.

In the next example, the area 6b in FIG. 10A is designated as the template image A. In this case, the control device 104 calculates the value x by dividing the value calculated as expressed in (7) based upon the values in FIGS. 10D and 10E by the number of pixels 81 in the template image A multiplied by 10. Through the process, x is calculated to be; $x=(400+350)/(81\times10)=0.926$. The control device 104 then determines the output value $\beta$ of the sigmoid function as expressed in (5) by using the value x thus calculated. The output value $\beta$ calculated as described above to indicate the level of achromaticity is 0.3908. Since the template image A extracted from the area 6b containing the image of a white wall is a substantially a chromatic image, as explained earlier, $\beta$ takes on a value close to 0.

Based upon the value $\beta$ having been calculated as described above, the control device 104 normalizes the Y component average values corresponding to the various blocks constituting the template image A as expressed in (6). When the template image A is a substantially achromatic image, as in this case, too, the value obtained by multiplying the reference value, i.e., the Y component average value Y5 corresponding to the fifth block by $\beta$, which is a value close to 0, is smaller than the initial reference value and thus, it is ensured that the value to be subtracted from the Y component average values corresponding to the individual blocks is smaller than the initial reference value.

In the next example, the area 6c in FIG. 10A is designated as the template image A. In this case, the control device 104 calculates the value x by dividing the value calculated as expressed in (7) based upon the values in FIGS. 10F and 10G by the number of pixels 81 in the template image A multiplied by 10. Through the process, x is calculated to be; $x=(1428+2128)/(81\times10)=4.390$. The control device 104 then determines the output value $\beta$ of the sigmoid function as expressed in (5) by using the value x thus calculated. The output value $\beta$ calculated as described above to indicate the level of achromaticity is 1. Since the template image A extracted from the area 6c containing the image of clothing is a chromatic image, as explained earlier, $\beta$ takes on a value of 1.

Then, based upon the value having been calculated as described above, the control device 104 normalizes the Y component average values corresponding to the various blocks constituting the template image A as expressed in (6). Since $\beta$ is 1 in this case, as discussed just above, when the template image A is a chromatic image, the Y component average value Y5 corresponding to the fifth block multiplied by $\beta$ remains unchanged as a result, thus, it is ensured that a significant value is subtracted from the Y component average values corresponding to the individual blocks.

In the next example, the area 10a in FIG. 14A is designated as the template image A. It is to be noted that the area 10a in FIG. 14A, from which the template image A is extracted, contains an image of the hair of a person different from the person shown in FIG. 10A. It is also to be noted that the area 10a in FIG. 14A ranges over a 9×9 pixel area, as shown in FIG. 3A. FIG. 14B presents the calculation results obtained by determining the absolute differences of the Cb component values indicated at the individual pixels within the area 10a from the value of 128, which represents a chromatic color. FIG. 14C presents the calculation results obtained by determining the absolute differences of the Cr component values indicated at the individual pixels within the area 10a from the value of 128, which represents a chromatic color.

The control device 104 calculates the value x by dividing the value calculated as expressed in (7) based upon the values in FIGS. 14B and 14C by the number of pixels 81 in the template image A multiplied by 10. Through the process, x is calculated to be; $x=550/(81\times10)=0.68$. The control device 104 then determines the output value $\beta$ of the sigmoid function as expressed in (5) by using the value x thus calculated. The output value $\beta$ calculated as described above to indicate the level of achromaticity is 0.13. The value calculated for $\beta$ as described above indicates that the hair of the person in the area 10a is slightly more chromatic than the dark hair in the image contained in the area 6a in FIG. 10A.

While $\beta$ having been calculated as described above to be used to normalize the Y component average values corresponding to the individual blocks constituting the template image A as expressed in (6) is a value close to 0, the value $\beta$ in this case is still larger than the value calculated for the area 6a and thus, a greater value is subtracted from the Y component average values for the various blocks. In other words, when the chromaticity of the template image A is higher, a larger value is subtracted from the Y component average values corresponding to the individual blocks so as to assure highly accurate similarity value calculation.

Figure 15:
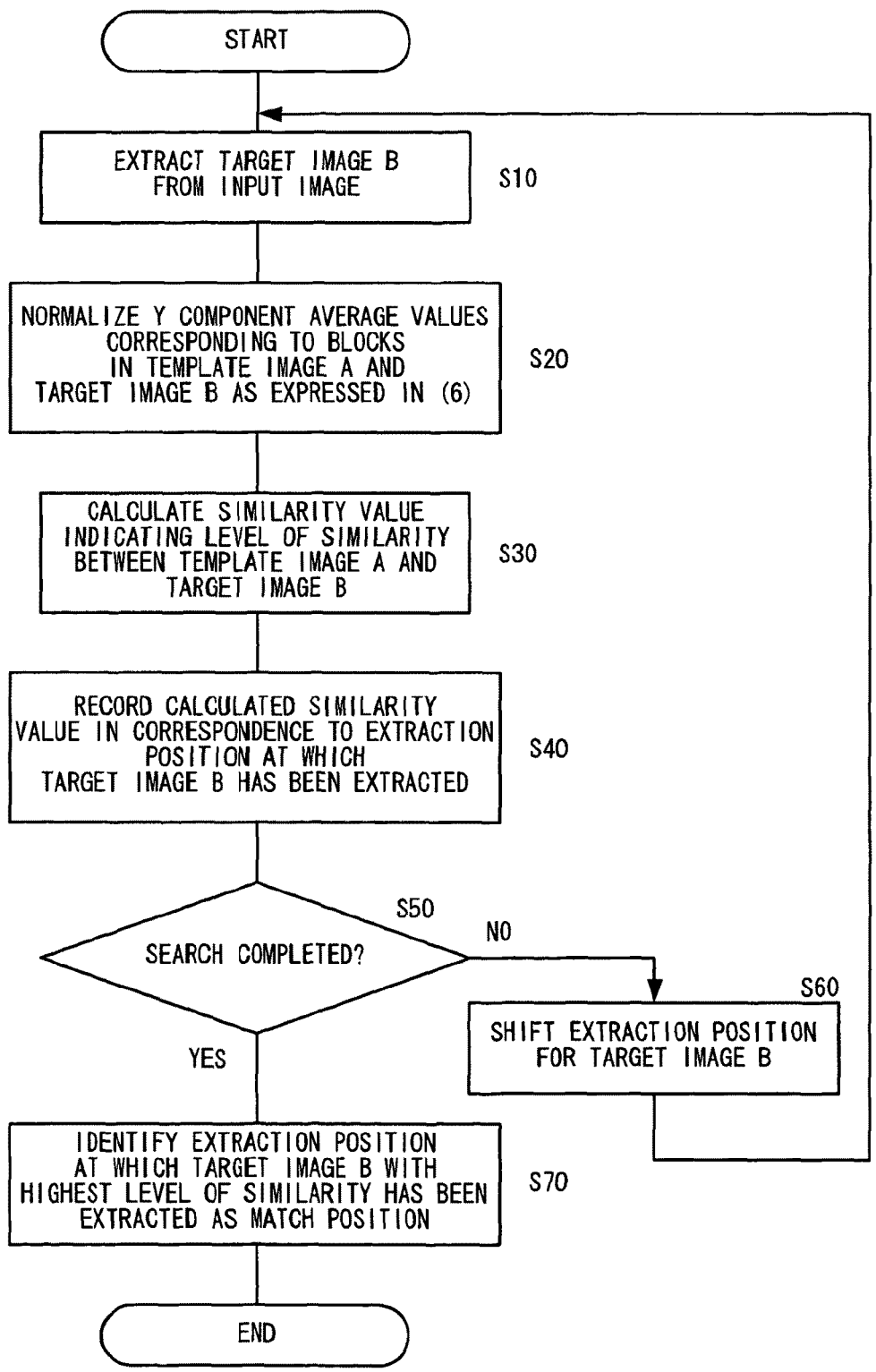
FIG. 15 presents, in the second embodiment, a flowchart of the template matching processing.
Figure 16:
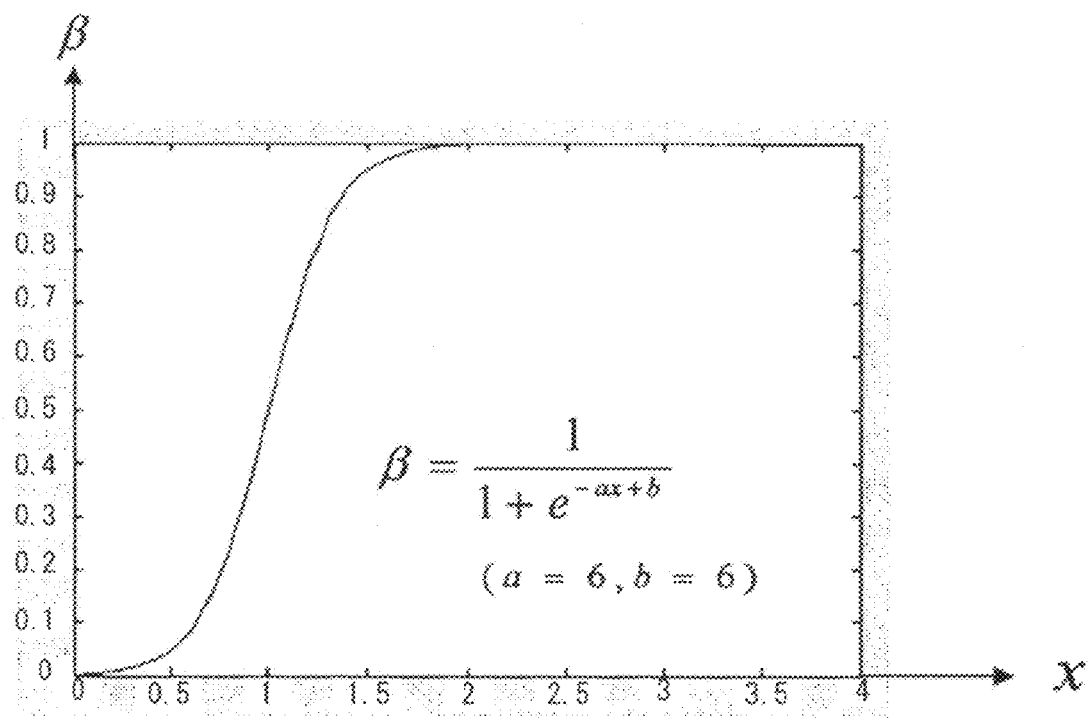
FIG. 16 presents, in the third embodiment, a specific example of a sigmoid function.

FIG. 15 presents a flowchart of the template matching processing executed in the present embodiment. The processing in FIG. 15 is executed by the control device 104 based upon a program started up as image data originating from the image sensor 103 are input. It is assumed that a template image containing the tracking target subject, to be used in the template matching processing, is obtained in advance and is recorded in the SDRAMs used as a buffer memory.

The processing executed in the embodiment differs from that in the flowchart presented in FIG. 9, in reference to which the first embodiment has been described, only in the processing executed in step S20. Accordingly, the following explanation focuses on the processing executed in step S20 and a repeated explanation of the processing executed in the other steps is not provided.

In step S20, the control device 104 divides the template image A and the target image B into nine blocks each and calculates the Y component average values, the Cb component average values and the Cr component average values in correspondence to the individual blocks, as explained earlier. After the control device 104 normalizes, as expressed in (6), the Y component average values having been calculated, the operation proceeds to step S30.

The following advantages are achieved through the embodiment described above.

(1) The control device 104 divides the template image A and the target image B each into a plurality of blocks (areas), calculates the Y component average values, the Cb component average values and the Cr component average values in correspondence to the individual blocks and designates the Y component average value in a specific block as a reference value. Then, for both the template image A and the target image B, the control device 104 calculates the output value $\beta$ of the sigmoid function, to be used as a coefficient, based upon the Cb component values and the Cr component values indicated at the individual pixels and normalizes the Y component average values having been calculated for the various blocks. Further, the control device 104 executes the Y component average value normalization individually for both the template image A and the target image B, by subtracting the reference value multiplied by the coefficient from each of the Y component average values corresponding to the individual blocks.

The control device 104 calculates the similarity value indicating the level of similarity between the template image A and the target image B based upon the normalized Y component average values, the Cb component average values and the Cr component average values, corresponding to the blocks in the template image A, and the normalized Y component average values, the Cb component average values and the Cr component average values, corresponding to the individual blocks in the target image B. The control device 104 executes the template matching processing by identifying the position taken up by the target image B within the input image, which achieves the highest level of similarity to the template image A, based upon the similarity values having been calculated as described above.

As a result, regardless of whether the template image A and the target image B are chromatic images or achromatic images, highly accurate template matching can be executed by eliminating the influence caused by a change in the image brightness. Furthermore, even when both the template image A and the target image B are substantially achromatic images, the deterioration in template matching accuracy can be prevented.

(2) The output $\beta$ of the sigmoid function, used as a coefficient in the normalization of the Y component average values, takes on values within the range of 0 to 1. The output value $\beta$ of the sigmoid function indicates the level of achromaticity of the template image A or the target image B, with $\beta$ taking on a value closer to 0, indicating that the image is more achromatic (that the level of achromaticity is higher) and $\beta$ taking on the value of 0 indicating that the image is completely achromatic. In addition, $\beta$ taking on a value closer to 1 indicates that the image is more chromatic (that the level of achromaticity is lower) and $\beta$ taking on the value of 1 indicates that the image is completely chromatic.

-Variations-

It is to be noted that the camera achieved in the embodiment described above allows for the following variations.

(1) The control device 104 in the embodiment divides the template image A and the target image B into nine blocks each and calculates the Y component average values, the Cb component average values and the Cr component average values in correspondence to one of the blocks. Then, after the Y component average values having been calculated are normalized, the control device calculates the similarity value indicating the level of similarity between the template image A and the target image B based upon the normalized Y component average values, the Cb component average values and the Cr component average values. As an alternative, the control device 104 may calculate the sums (totals) of the values representing the various components in the individual blocks, instead of the average values of the components, and then, based on the sums, normalize the Y component sums, and determine the similarity between the template image A and the target image B. In this way, as in the embodiment described above a highly accurate template matching can be executed by eliminating the influence caused by a change in the image brightness, both for the cases that the template image A and the target image B are chromatic images and that those are achromatic images.

(2) In the embodiment described above, the control device 104 divides the template image A and the target image B into nine areas each and calculates the Y component average values, the Cb component average values and the Cr component average values in correspondence to all nine blocks in each image. However, the number of blocks into which the template image A and the target image B are divided by the control device 104 does not need to be nine. In addition, while the template image A and the target image B each range over a 9×9 pixel area and each of the blocks into which the template image A and the target image B are divided ranges over a 3×3 pixel area in the example described above, the areal size of the template image A and the target image B and the areal size of the blocks into which the template image and the target image are divided are not limited to those.

(3) In the embodiment described above, the control device 104 executes matching operation for the template image A and the target image B through the Sequential Similarity Detection Algorithm expressed in (1). However, the template matching processing may be executed by adopting another method. For instance, the matching operation for the template image A and the target image B may be executed through another method of the known art such as a normalized correlation method.

(4) While an explanation is given above in reference to the embodiment on an example in which the photographic subject is tracked through pattern matching processing executed in the camera 100, the processing described above may be executed at a personal computer or the like instead. For instance, the present invention may be adopted in a personal computer capable of reproducing a video image to execute template matching processing by designating each of the frames constituting the video image as the target image and using a template image prepared in advance.

Third Embodiment

The following is a description of the third embodiment. Since the camera achieved in the third embodiment assumes a configuration similar to that of the camera in the first embodiment, a repeated explanation is not provided. The embodiment is described by quoting as needed FIGS. 1 through 5B in reference to which the first embodiment has been described.

As the similarity value indicating the level of similarity between the template image A and the target image B is calculated as expressed in (8) below, when the image brightness is changed, there may occur that the matching accuracy is deteriorated, as has been explained in reference to the first embodiment and the second embodiment.

$$\Sigma|Y_A-Y_B|+\Sigma|Cb_A-Cb_B|+\Sigma|Cr_A-Cr_B| \quad (8)$$

It is to be noted that $Y_A$, $Cb_A$ and $Cr_A$ in expression (8) respectively represent the Y component average value, the Cb component average value and the Cr component average value calculated for each of the blocks in the template image A. Similarly, $Y_B$, $Cb_B$ and $Cr_B$ in expression (8) respectively represent the Y component average value, the Cb component average value and the Cr component average value calculated for each of the blocks in the target image B. These notation rules also apply to other expressions to be presented later.

The issue discussed above is fixed in the embodiment by executing template matching processing based upon the similarity values calculated as described below. The control device 104 first calculates an achromaticity factor β to be used as an index indicating whether the template image A is an achromatic image or a chromatic image, as expressed in (9) below. The achromaticity factor β taking on a value closer to 0 indicates that the image is more achromatic (that the achromaticity level is higher), whereas the achromaticity factor β taking on the value of 0 indicates that the image is completely achromatic. Further, the achromaticity factor β taking on a value closer to 1 indicates that the image is more chromatic (that the achromaticity level is lower), and the achromaticity factor β taking on the value of 1 indicates that the image is completely chromatic.

$$\beta = \frac{1}{1+e^{-ax+b}}(a=6, b=6) \quad (9)$$

It is to be noted that β is calculated by using a differentiable sigmoid function such as that expressed in (9). As shown in FIG. 5, the sigmoid function is an S-shaped function that continuously outputs β taking on values within the range of 0~1, univocally determined in correspondence to the input value x. The slope of the sigmoid function and the position at which its output value starts to shift closer to 1 are determined in correspondence to the values set for coefficients a and b. FIG. 5 presents a specific example of such a sigmoid function with a and b both set to 6. The embodiment is described by assuming that the achromaticity factor β is calculated by setting a and b to 6.

In addition, x is calculated as expressed in (10). It is to be noted that the normalization coefficient in expression (10) assumes a value selected based upon the results of tests conducted in advance. The processing in the embodiment may be executed by setting the normalization coefficient to, for instance, 310.

$$x = \text{round}\left(\frac{\sum|Cb-128|+\sum|Cr-128|}{\text{NORMALIZATION COEFFICIENT}}\right) \quad (10)$$

The control device 104 calculates the similarity value indicating the level of similarity between the template image A and the target image B as expressed in (11) below by using the achromaticity factor β having been calculated as expressed in (9).

$$(1-\beta)\Sigma|Y_A-Y_B|+\beta\Sigma(|Cb_A-Cb_B|+|Cr_A-Cr_B|) \quad (11)$$

Since the achromaticity factor β takes on a larger value (a value closer to 1) when the template image A is completely chromatic or substantially chromatic (hereafter summarily described as "chromatic") as explained earlier, the weight applied to the Y component similarity value, which is bound to be affected by any change in the image brightness, can be reduced by multiplying the Y component similarity value by (1−β), thereby making it possible to improve the template matching accuracy.

For instance, the input value x calculated as expressed in (10) based upon the similarity average values for the various components, calculated in correspondence to the individual blocks in the template image A as indicated in FIG. 4C, the similarity average values for the various components calculated in correspondence to the individual blocks in the target image B as indicated in FIG. 4D and the normalization coefficient set to 310 as described earlier, is 1.4. The achromaticity factor β calculated as expressed in (9) in correspondence to this input value x is 0.9. In this case, the weight applied to the Y component similarity value in expression (11) is 0.1, which reduces the contribution of the Y component similarity value in the calculation results for the similarity value indicating the level of similarity between the template image A and the target image B, to 10%.

When the template image A is completely achromatic or substantially achromatic (hereafter summarily described as "achromatic"), the Cb component values and the Cr component values at the individual pixels invariably take on values close to 128, which represents achromatic color. Thus, the Cb component similarity average values and the Cr component similarity average values calculated in correspondence to the individual blocks, too, all take on values close to 128. For instance, when the substantially achromatic image inside the area 6a in the image shown in FIG. 17A is extracted as the template image A, the similarity average values for the various components are calculated as listed in FIG. 17C in correspondence to the individual blocks. FIG. 17C indicates that the Cb component similarity average values and the Cr component similarity average values calculated for the individual blocks all take on values close to 128.

Template matching processing executed for the image shown in FIG. 17B by using this template image A is now examined. The similarity average values calculated for the various components in correspondence to the individual blocks in the substantially achromatic image contained within the area 6b is designated as the target image B are listed in FIG. 17D. The similarity average values calculated for the various components in correspondence to the individual blocks in the substantially achromatic image contained within the area 6c designated as the target image B are listed in FIG. 17E. In either case, the Cb component similarity average values and the Cr component similarity average values calculated in correspondence to the individual blocks in the target image B all take on values close to 128.

FIG. 18A presents a chart of the absolute values representing the differences between the calculation results in FIG. 17C and the calculation results in FIG. 17D. The chart indicates that the sum of the Y component similarity average values is 88, that the sum of the Cb component similarity average values is 8 and that the sum of the Cr component similarity average values is 9. FIG. 18B presents a chart of the absolute values representing the differences between the calculation results in FIG. 17C and the calculation results in FIG. 17E. The chart indicates that the sum of the Y component similarity average values is 148, that the sum of the Cb component similarity average values is 10 and that the sum of the Cr component similarity average values is 12.

The results presented in FIGS. 18A and 18B indicate that if the contribution factor of the Cr component similarity value and the contribution factor of the Cb component similarity value are set high in the calculation of the similarity value for the template image A and the target image B, both the area 6b and the area 6c are highly likely to be judged to have high levels of similarity to the template image A, to result in lowered template matching accuracy. Accordingly, by multiplying both the Cr component similarity value and the Cb component similarity value by the achromaticity factor β, assuming a small value (closer to 0) as explained earlier, in the arithmetic operation expressed in (11), the weight applied to the Cr component similarity value and the Cb component similarity value can be reduced and as a result, the template matching accuracy is not lowered.

For instance, the achromaticity factor β calculated for the template image A is 0.01 in the example presented in FIG. 17C. Accordingly, by multiplying the Cr component similarity value and the Cb component similarity value by this achromaticity factor β in the operation expressed in (11), the Cr component similarity value and the Cb component similarity value can be reduced to insignificant values that may be ignored in the calculation of the similarity value for the template image A and the target image B.

By calculating the similarity value used to indicate the level of similarity between the template image A and the target image B as expressed in (11), the control device 104 is able to execute accurate template matching even when the brightness of the target image does not match the brightness of a chromatic template image A and also is able to sustain a high level of template matching accuracy even when the template image A is an achromatic image. However, if the template image A is an achromatic image, a significant weight is applied to the Y component similarity value in the arithmetic operation executed as expressed in (11) to calculate the similarity value, and thus, any change in the image brightness can not be treated adequately.

In the embodiment, even when the template image is an achromatic image, the template matching accuracy is improved in the event of a change in the image brightness by using edge images in the similarity value calculation as described below. As explained earlier, a change in the image brightness affects the Y component values in the image and accordingly, edge images (hereafter referred to as "Y edge images") are obtained in correspondence to the template image A and the target image B by extracting Y component edges when calculating the similarity value for the template image A and the target image B.

In reference to FIG. 19, an example of a Y edge image generation method that may be adopted in conjunction with the present invention is described. FIG. 19A lists the Y component values indicated at the individual pixels constituting the template image A. The control device 104 generates an image A' in FIG. 19B by shifting each of the Y component values indicated at the individual pixels constituting the template image A by one pixel position to the right/downward. For instance, the Y component value at a pixel 8a in the template image A is assumed at a pixel 8a' taking up a position in the image A' offset to the left/downward relative to the initial position, whereas the Y component value at pixel 8b in the template image A is assumed at pixel 8b' taking up a position in the image A' offset to the left/downward relative to the initial position.

In addition, the Y component values indicated at the pixels at the right end of the template image A are each shifted to take up a position at the left end of the image A', offset downward by one pixel position. For instance, the Y component value indicated at a pixel 8c second from the top at the right end in the template image A is assumed at a pixel 8c' taking up the third position from the top at the left end of the image A'. Further, the Y component values indicated at the pixels at the lower end of the template image A are each shifted so as to assume a pixel position at the upper end of the image A', offset to the right by one pixel position. For instance, the Y component value at a pixel 8d taking up the fourth position from the left at the lower end of the template image A is assumed at a pixel 8d' taking up the fifth position from the left at the upper end of the image A'.

Figure 20B:
FIGS. 20A and 20B present, in the third embodiment, specific examples of the Y image and the Y edge image.
Figure 20A:
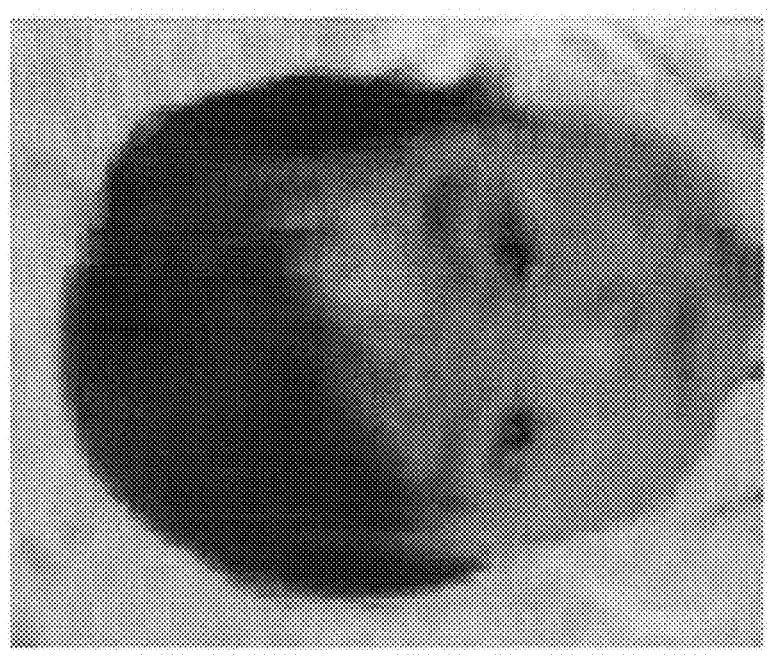

The control device 104 generates a Y edge image by determining the absolute values representing the differences between the Y component values indicated at the pixels constituting the template image A and the Y component values indicated at the corresponding pixels in the image A' generated as described above. The control device 104 also generates a Y edge image for the target image B by executing similar processing on the target image B. Through the processing, a Y edge image such as that shown in FIG. 20B may be generated based upon the Y image shown in FIG. 20A.

The control device 104 divides the Y edge image generated as described above based upon the template image A into nine blocks each ranging over a 3×3 pixel area and calculates a Y edge component average value $Y_{edge\_A}$ in correspondence to each block. In addition, it divides the Y edge image of the target image B into nine blocks and calculates a Y edge component average value $Y_{edge\_B}$ in correspondence to each block. The control device 104 then calculates the similarity value used to indicate the level of similarity between the template image A and the target image B as expressed in (12) below.

$$\Sigma|Y_{edge\_A}-Y_{edge\_B}|+\Sigma|Cb_A-Cb_B|+\Sigma|Cr_A-Cr_B| \qquad (12)$$

The following explanation is given by assuming that the target image B2 shown in FIG. 21C actually achieves the highest level of similarity to the achromatic template image A in FIG. 21A among target images B1, B2 and B3 respectively shown in FIGS. 21B, 21C and 21D. FIG. 22 presents the results of similarity value calculation executed as expressed in (8) to calculate the similarity values indicating the levels of similarity of the target images B1, B2 and B3 to the template image A.

Namely, the similarity value calculated for the template image A and the target image B1 is 427, the similarity value calculated for the template image A and the target image B2 is 487 and the similarity value calculated for the template image A and the target image B3 is 284. Thus, even though the target image B2 actually has the highest level of similarity to the template image A, the template matching accuracy is compromised due to the achromaticity of the template image A and the target image B3 is erroneously judged to have the highest level of similarity to the template image A.

However, based upon Y edge images created in correspondence to the template image A and the target images B1, B2 and B3, the Y edge component average values, the Cb component average values and the Cr component average values are calculated as listed in FIG. 23 in correspondence to the individual blocks constituting the template image A and the target images B1, B2 and B3.

FIG. 24 presents the results of similarity value calculation executed as expressed in (12) to determine the similarity values indicating the levels of similarity of the target image B1, the target image B2 and the target image B3 to the template image A. Namely, the similarity value calculated for the template image A and the target image B1 is 58, the similarity value calculated for the template image A and the target image B2 is 30 and the similarity value calculated for the template image A and the target image B3 is 61. Thus, the smallest similarity value is calculated for the template image A and the target image B2, the level of similarity between which is actually the highest. Consequently, the subject position can be identified and the subject can be tracked with a high level of accuracy based upon the template matching results.

It is to be noted that the control device 104 may calculate the similarity value for the template image A and each target image B as expressed in (13) below, which incorporates expression (12) with expression (11), so as to further improve the template matching accuracy even in the event of a change in the image brightness, regardless of whether the template image A is a chromatic image or an achromatic image.

$$(1-\beta)\Sigma|Y_{edge\_A}-Y_{edge\_B}|+\beta\Sigma(|Cb_A-Cb_B|+|Cr_A-Cr_B|) \quad (13)$$

Among the various methods of similarity value calculation, each executed as expressed in one of expressions allow (11)~(13), the arithmetic operation expressed in (13) assures the maximum extent of the improvement in the template matching accuracy, the second highest template matching accuracy is achieved by calculating the similarity value as expressed in (12) and the template matching accuracy is lowest when the similarity value is calculated as expressed in (11). However, the arithmetic operation executed as expressed in (11) can be completed most quickly, the arithmetic operation executed as expressed in (12) is second fastest and the arithmetic operation executed as expressed in (13) is the most time-consuming. Accordingly, a specific calculation expression among expressions (11)~(13) to be used in the similarity value calculation should be determined by prioritizing the template matching accuracy and the processing speed. The specific calculation expression to be used may be selected by the user based upon his preference or a given calculation expression may be selected as a fixed setting in the camera 100.

The following advantages are achieved through the embodiment described above.

(1) The control device 104 divides the template image A and the target image B each into a plurality of blocks (divided areas) and calculates the Y component average value, the Cb component average value and the Cr component average value in correspondence to each block. The control device 104 then calculates individual component similarity values for the template image A and the target image B, and calculates the similarity value indicating the level of similarity between the template image A and the target image B by multiplying each component similarity value by a weight determined based upon the achromaticity factor β. As a result, the control device 104 is able to execute highly accurate template matching by suitably treating the brightness change of the target image in case where the template image A is chromatic, and also is able to sustain a high level of template matching accuracy in case where the template image A is achromatic.

(2) The control device 104 generates Y edge images in correspondence to the template image A and the target image B by extracting Y component edges, and calculates the similarity value for the template image A and the target image B based upon the Y edge component values, the Cb component values and the Cr component values. Thus, even when the template image A is an achromatic image, more accurate template matching can be executed by skillfully treating the brightness change of the target image.

-Variations-

It is to be noted that the camera achieved in the embodiment described above allows for the following variations (1) In the embodiment described above, the control device 104 divides the template image A and the target image B into nine areas each and calculates various component average values in correspondence to each area and then calculates the individual component similarity values based upon the average values. However, the number of blocks into which the template image A and the target image B is divided by the control device 104 does not need to be nine. In addition, the similarity values may instead be calculated based upon the component values indicated at the individual pixels without dividing the template image A and the target image B into a plurality of blocks.

(2) The control device 104 in the embodiment described above calculates the achromaticity factor β used as an index indicating whether the template image A is an achromatic image or a chromatic image as expressed in (9) and calculates the similarity value indicating the level of similarity between the template image A and the target image B by using the achromaticity factor β thus calculated in the arithmetic operation executed as expressed in expression (11) or expression (13). As an alternative, the control device 104 may calculate a similarity value indicating the level of similarity between the template image A and the target image B based upon an achromaticity factor β calculated as expressed in (9) to be used as an index indicating whether the target image B is an achromatic image or a chromatic image.

(3) The control unit 104 in the embodiment generates the image A' in FIG. 19B by shifting the Y component values at the individual pixels constituting the template image A in FIG. 19A each by one pixel position to the right/downward and creates a Y edge image such as that shown in FIG. 19C represented by the absolute values of the differences between the Y component values at the corresponding pixels in the template image A and the Y component values at the pixels in the image A' generated as described above. However, the control device 104 may generate an image A' such as that shown in FIG. 19B by shifting the Y component values at the pixels constituting the template image A each by a single pixel position along a direction other than the rightward/downward direction.

(4) In the embodiment described above, the control device 104 tracks the subject in a live image. However, the present invention is not limited to this example and the control device 104 of a camera 100 equipped with a video shooting function may track the subject from one frame to the next through the frames of images constituting a video that has already been shot, instead of a live image.

(5) In the embodiment described above, the control device 104 in the camera 100 tracks the subject by executing the template matching processing. However, the template matching processing may instead be executed at a terminal such as a personal computer by recording a program enabling the template matching processing at the terminal. In such a case, video image data expressing a video image having been shot in the camera may be taken into the terminal and the template matching processing may be executed on the video image data in order to track the subject from one frame to the next through the frames of images constituting the video image. In addition, the present invention may be adopted in a portable telephone equipped with a camera.

Figure 25:
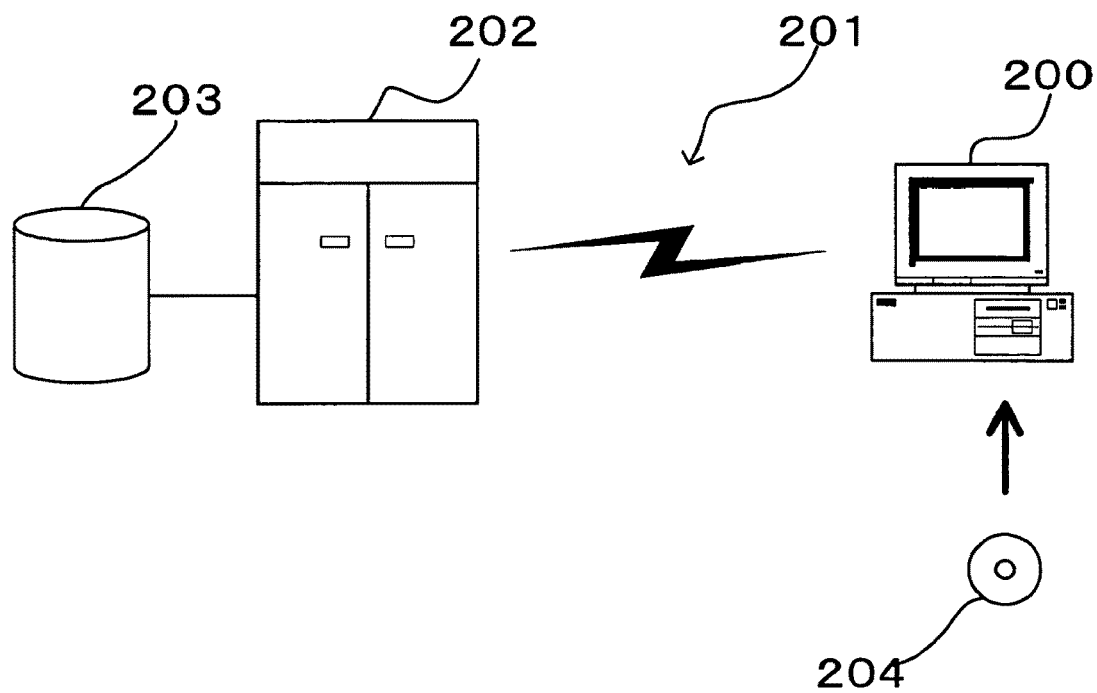

(6) As explained earlier, a program enabling execution of the template matching processing executed by the control device 104 of the camera 100 in the first through third embodiments, may be installed in a personal computer or the like and may be executed at the personal computer. In addition, when the present invention is adopted in a personal computer or the like, the program may be provided to the personal computer via a recording medium such as a CD-ROM or via data signals exchanged on the Internet or the like. FIG. 25 illustrates how the program may be provided through such media. A personal computer 200 receives the program via a CD-ROM 204. The personal computer 200 also has a connection capability to connect with a communication line 201. A computer 202 is a server computer that provides the program stored in a recording medium such as a hard disk 203. The communication line 201 may be a communication network such as the Internet or another type of communication network, or it may be a dedicated communication network. The computer 202 reads out the program from the hard disk 203 and transmits the program thus read out to the personal computer 200 via the communication line 201. Namely, the program may be embodied as a data signal on a carrier wave and transmitted via the communication line 201. In short, the program can be distributed as a computer-readable computer program product assuming any of various modes such as a recording medium and a data signal.

The above described embodiments are examples, and various modifications can be made without departing from the scope of the invention.

What is claimed is:

1. An image matching device, comprising:
a dividing unit that divides a target image, contained in a search window set within an input image constituted with pixels each having a luminance component and a chrominance component, and a template image constituted with pixels each having the luminance component and the chrominance component, each into a plurality of divided areas;
a representative value calculation unit that calculates a luminance component representative value and a chrominance component representative value in correspondence to each of the divided areas;
a normalizing unit that normalizes the luminance component representative value having been calculated in correspondence to each divided area; and
a template matching processing unit that executes template matching processing based upon the normalized luminance component representative value and the chrominance component representative value corresponding to each of the divided areas in the template image, and upon the normalized luminance component representative value and the chrominance component representative value corresponding to each of the divided areas in the target image wherein: the normalizing unit normalizes the luminance component representative value corresponding to each divided area by designating one divided area among the plurality of divided areas as a reference area and subtracting the luminance component representative value corresponding to the reference area from the luminance component representative value corresponding to each of the plurality of divided areas.

2. An image matching device according to claim 1, wherein:
the luminance component representative value calculated in correspondence to each divided area is a luminance component average value, a luminance component sum or a luminance component median corresponding to the divided area, and the chrominance component representative value calculated in correspondence to each divided area is a chrominance component average value, a chrominance component sum or a chrominance component median corresponding to the divided area.

3. An image matching device according to claim 1, further comprising:
a subject tracking unit that tracks a subject from one input image to a next input image among a plurality of input images based upon matching results provided by the template matching processing unit.

4. A camera, comprising:
an imaging unit that obtains an image by capturing a subject image; and
an image matching device according to claim 3, wherein:
the image matching device executes the template matching processing by designating each of images captured in time series at the imaging unit as the target image to track a photographic subject from one image to a next among a plurality of images.

5. An image matching device according to claim 1, wherein:
the input image is an image expressed in a YCbCr color space, the luminance component corresponds to a Y component in the YCbCr color space and the chrominance component corresponds to a Cb component and a Cr component in the YCbCr color space; and
the template matching processing unit executes the template matching processing based upon Cb component values each corresponding to one of the divided areas, Cr component values each corresponding to one of the divided areas and normalized Y component values each normalized by the normalizing unit in correspondence to one of the divided areas in both the template image and the target image.

6. An image matching device according to claim 5, wherein:
the normalizing unit normalizes the Y component value corresponding to each divided area by designating one divided area among the plurality of divided areas as a reference area and subtracting the Y component value corresponding to the reference area from the Y component value corresponding to each of the plurality of divided areas.

7. An image matching device according to claim 1, wherein:
the input image is an image expressed in a YCbCr color space, the luminance component corresponds to a Y component in the YCbCr color space and the chrominance component corresponds to a Cb component and a Cr component in the YCbCr color space; and
the template matching processing unit executes the template matching processing based upon Y component values each corresponding to one of the divided areas, Cb component values each corresponding to one of the divided areas, Cr component values each corresponding to one of the divided areas and normalized Y component values each normalized by the normalizing unit in correspondence to one of the divided areas in both the template image and the target image.

8. An image matching device according to claim 1, further comprising:
a coefficient calculation unit that calculates a coefficient based upon chrominance component values indicated at individual pixels in correspondence to each of the template image and the target image, wherein:
the normalizing unit normalizes the luminance component representative value corresponding to the divided area by designating the luminance component representative value in one of the divided areas as a reference value and subtracting the reference value multiplied by the coefficient from a luminance component average value corresponding to the divided area; and the template matching processing unit calculates a similarity factor indicating a level of similarity between the template image and the target image based upon the normalized luminance component representative value and the chrominance component representative value corresponding to each of the divided areas in the template image, and upon the normalized luminance component representative value and the chrominance component representative value corresponding to each of the divided areas in the target image, and executes template matching processing by identifying a position taken up within the input image by the target image achieving a highest level of similarity to the template image based upon similarity factor calculation results.

9. An image matching device according to claim 8, wherein:

the luminance component representative value calculated in correspondence to each divided area is a luminance component average value, a luminance component sum or a luminance component median corresponding to the divided area, and the chrominance component representative value calculated in correspondence to each divided area is a chrominance component average value, a chrominance component sum or a chrominance component median corresponding to the divided area.

10. An image matching device according to claim 8, wherein:

the coefficient assumes a value within a range of 0 to 1.

11. An image matching device according to claim 10, wherein:

the coefficient is a value output through a differentiable function, an output value of which takes on continuous values within the range of 0 to 1 and is determined univocally relative to an input value.

12. An image matching device according to claim 11, wherein:

the function is a sigmoid function.

13. A camera, comprising:

an imaging unit that obtains an image by capturing a subject image; and an image matching device according to claim 8.

14. An image matching device according to claim 1, further comprising:

a coefficient calculation unit that calculates a coefficient based upon chrominance component values indicated at individual pixels in correspondence to each of the template image and the target image, wherein:

the normalizing unit normalizes the luminance component representative value corresponding to each divided area by designating the luminance component representative value in one of the divided areas as a reference value and subtracting the reference value multiplied by the coefficient from a luminance component average value corresponding to the divided area; and the coefficient takes on a value within a range of 0 to 1 to indicate a level of achromaticity of an image, with the coefficient assuming a value closer to 0 indicating that the image is more achromatic and the coefficient assuming a value closer to 1 indicating that the image is more chromatic.

15. An image matching device comprising:

a component similarity value calculation unit that calculates a luminance similarity value and a chrominance similarity value by using a template image constituted with pixels each having a luminance component and a chrominance component and a target image contained within a search window set within an input image constituted with pixels each having the luminance component and the chrominance component, respectively based upon the luminance component in the template image and the target image and based upon the chrominance component in the template image and the target image;

an achromaticity factor calculation unit that calculates a value indicating a level of achromaticity of the template image or the target image based upon values indicating the chrominance component in the template image or the target image;

a similarity value calculation unit that calculates a similarity value indicating a level of similarity between the template image and the target image by weighting the luminance similarity value and the chrominance similarity value based upon the value indicating the level of achromaticity having been calculated by the achromaticity factor calculation unit; and a matching unit that executes template matching processing by identifying a position taken up within the input image by the target image achieving a highest level of similarity to the template image based upon similarity value calculation results provided by the similarity value calculation unit.

16. An image matching device according to claim 15, wherein:

the value indicating the level of achromaticity falls within a range of 0 to 1.

17. An image matching device according to claim 16, wherein:

the value indicating the level of achromaticity is output through a differentiable function, an output value of which takes on continuous values within the range of 0 to 1 and is determined univocally relative to an input value.

18. An image matching device according to claim 17, wherein:

the function is a sigmoid function.

19. A camera, comprising:

an imaging unit that obtains an image by capturing a subject image; and an image matching device according to claim 15.

* * * * *